(12) United States Patent
Nishi et al.

(10) Patent No.: US 7,469,534 B2
(45) Date of Patent: Dec. 30, 2008

(54) LOAD CONTROL STRUCTURE FOR WORK VEHICLE

(75) Inventors: Eiji Nishi, Kawachinagano (JP); Keishiro Nishi, Sakai (JP); Atsushi Shinkai, Tondabayashi (JP); Yasunobu Nakatani, Sakai (JP); Muneji Okamoto, Matsubara (JP); Yoichi Sugihara, Sakai (JP)

(73) Assignee: Kubota Corporation, Osaka (JP)

( * ) Notice: Subject to any disclaimer, the term of this patent is extended or adjusted under 35 U.S.C. 154(b) by 163 days.

(21) Appl. No.: 11/520,457

(22) Filed: Sep. 13, 2006

(65) Prior Publication Data
US 2007/0068152 A1 Mar. 29, 2007

(30) Foreign Application Priority Data

| Sep. 26, 2005 | (JP) | 2005-278252 |
| Sep. 30, 2005 | (JP) | 2005-286076 |
| Sep. 30, 2005 | (JP) | 2005-286077 |
| Sep. 30, 2005 | (JP) | 2005-286080 |

(51) Int. Cl.
*B60K 17/10* (2006.01)
*B60K 41/18* (2006.01)

(52) U.S. Cl. ............... 60/428; 60/445; 60/490
(58) Field of Classification Search ............... 60/368, 60/428, 431, 445, 487, 490
See application file for complete search history.

(56) References Cited

U.S. PATENT DOCUMENTS

| 5,177,964 A | * | 1/1993 | Tanaka et al. | 60/490 |
| 5,184,466 A | * | 2/1993 | Schniederjan et al. | 60/448 |
| 5,784,883 A | * | 7/1998 | Ohkura et al. | 60/448 |
| 6,182,448 B1 | * | 2/2001 | Ohkura et al. | 60/445 |
| 6,668,549 B2 | * | 12/2003 | Yano et al. | 60/490 |
| 6,915,631 B2 | * | 7/2005 | Kado et al. | 60/490 |

FOREIGN PATENT DOCUMENTS

| EP | 1008785 A2 | 6/2000 |
| JP | 62-015135 | 1/1987 |
| JP | 06-017928 | 1/1994 |

* cited by examiner

*Primary Examiner*—Thomas E Lazo
(74) *Attorney, Agent, or Firm*—The Webb Law Firm

(57) ABSTRACT

A load control structure for a work vehicle comprises: a device for detecting operating position of a manually operated speed change operating element; an engine load detection device for detecting load on an engine of the work vehicle; a swash plate position detecting device for detecting an operating position of a swash plate of a variable displacement pump of a hydrostatic continuously variable speed change device; a pump operating device for steplessly operating the swash plate of the variable displacement pump; a motor operating device for operating a swash plate of a variable displacement motor of the hydrostatic continuously variable speed change device between at least two speed change positions including a higher speed position and a lower speed position; a control device for controlling the operations of the pump operating device and the motor operating device. The control device has a automatic pump swash plate control device for controlling the operation of the pump operating device, based on detected information from the load detection device and detected information from the swash plate position detecting device, such that the greater an engine load is, greater is the extent to which the swash plate of the variable displacement pump is operated to a low speed side; and a motor swash plate control device for controlling the motor operating device so as to change the position of the swash plate of the variable displacement motor between the at least two speed change positions.

13 Claims, 25 Drawing Sheets

Fig.10
(A)
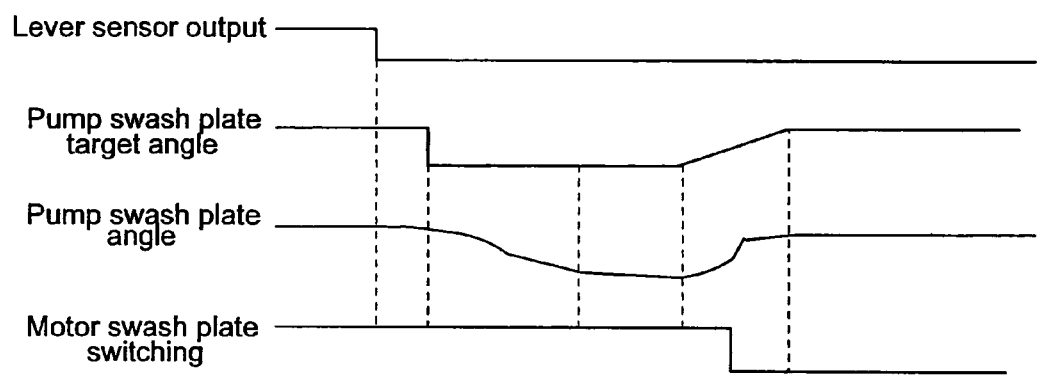
(B)
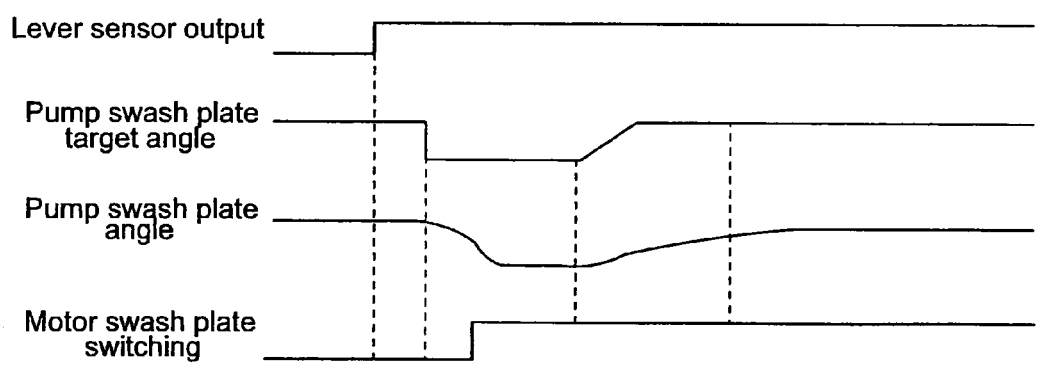

Mechanical servo + 2 speeds

Electronic servo only

Fig. 21
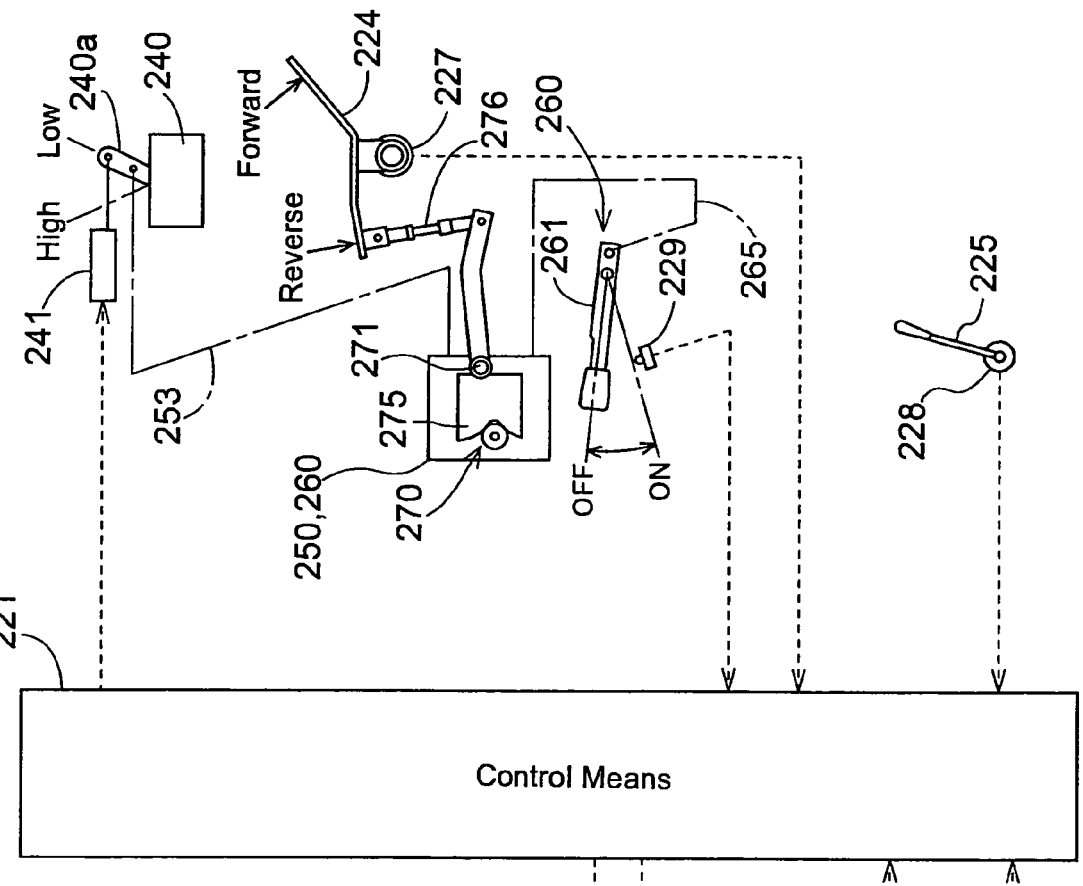
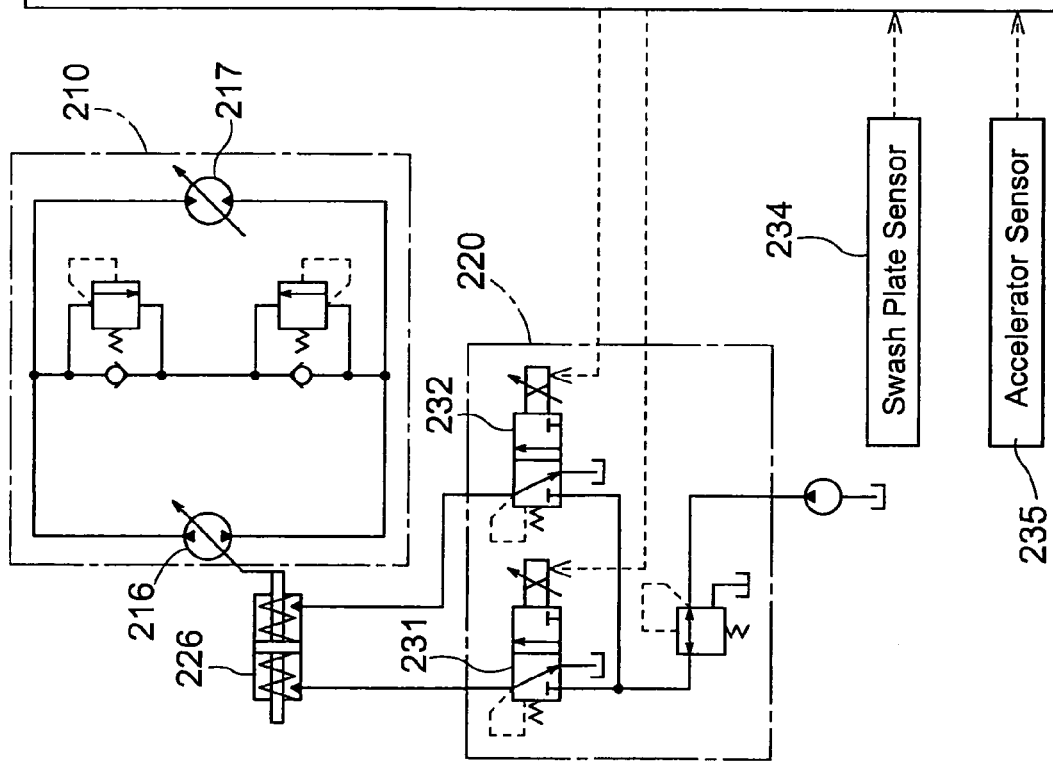

LOAD CONTROL STRUCTURE FOR WORK VEHICLE

BACKGROUND OF THE INVENTION

The present invention is directed to a load control structure for a work vehicle.

A conventional load control structure for work vehicles included one that controlled the motor operating means such that the swash plate of the variable displacement motor is moved from a higher speed position to a lower speed position when the engine load rises beyond a first predetermined value and such that the swash plate of the variable displacement motor is moved from the lower speed position to the higher speed position when the engine load decreases below a second predetermined value (see, for example, JP 6-17928), or one that controlled the operation of the pump operating means, based on detected information from the load detection means and detected information from the swash plate position detecting means, such that the greater an engine load is, greater is the extent to which the swash plate of the variable displacement pump is operated to a low speed side.

A control of the variable displacement pump based on load is suitable for operations with relatively small engine load and a control of the variable displacement pump based on load is suitable for operations with relatively large load. However, in the conventional systems as described above, no structure was provided that was suitable over a wide range of operational load from a small engine load to a large engine load.

SUMMARY OF THE INVENTION

An object of the present invention is to provide a load control structure that is suitable for wide range of engine load.

A load control structure for a work vehicle in accordance with the present invention comprises: means for detecting operating position of a manually operated speed change operating element; engine load detection means for detecting load on an engine of the work vehicle; swash plate position detecting means for detecting an operating position of a swash plate of a variable displacement pump of a hydrostatic continuously variable speed change device; pump operating means for steplessly operating the swash plate of the variable displacement pump; motor operating means for operating a swash plate of a variable displacement motor of the hydrostatic continuously variable speed change device between at least two speed change positions including a higher speed position and a lower speed position; and control means for controlling the operations of the pump operating means and the motor operating means. The control means has automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and motor swash plate control means for controlling the motor operating means so as to change the position of the swash plate of the variable displacement motor between the at least two speed change positions.

Because both the swash pate of the variable displacement pump and the swash pate of the variable displacement pump are adjusted, a load control structure that is suitable for wide range of engine load is provided.

BRIEF DESCRIPTION OF THE DRAWINGS

FIG. 10 is graph showing the movement of the pump swash plate when the motor swash plate position is being changed.

FIG. 21 is a block diagram of travel control device.

DETAILED DESCRIPTION OF PREFERRED EMBODIMENTS

Figure 1:
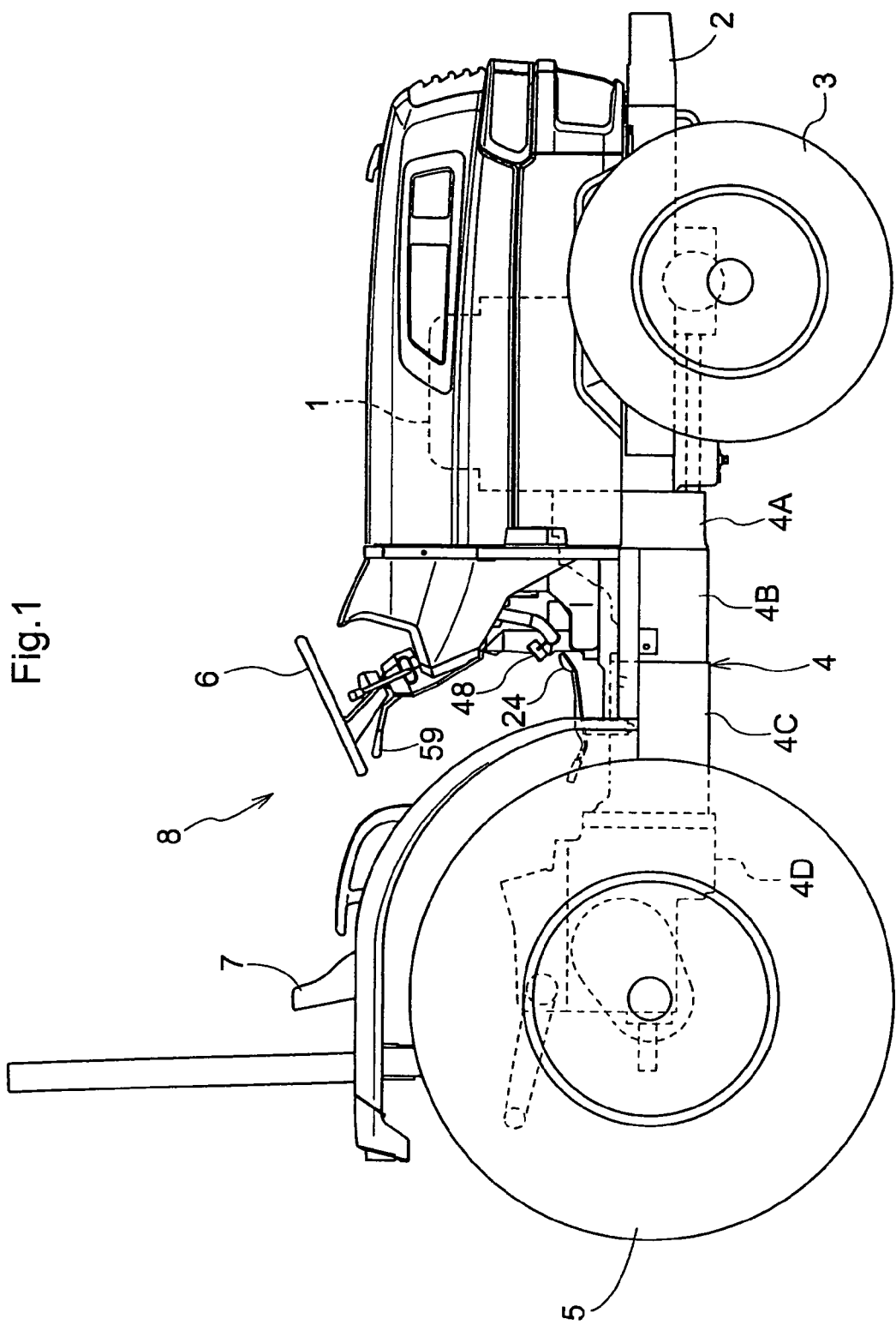
FIG. 1 is a side view of a tractor as an example of a work vehicle.

The entire side view of the tractor as an example of a work vehicle is shown in FIG. 1. This tractor has a front frame 2 that supports the engine 1 via a vibration insulator, front wheels 3 supported to either side of the front frame 2, a transmission case 4 that also functions as a frame connected with the engine 1, and the rear wheels 5 provided to either side of the transmission case 4. The work vehicle has the operator's section 8 equipped with a steering wheel 6, the operator's seat 7, etc. above a transmission case 4. The tractor has several sensors as described below. These sensors are known and conventional such as rotation sensors, which can be of optical or magnetic type or otherwise, and will not be described in detail below.

Figure 2:
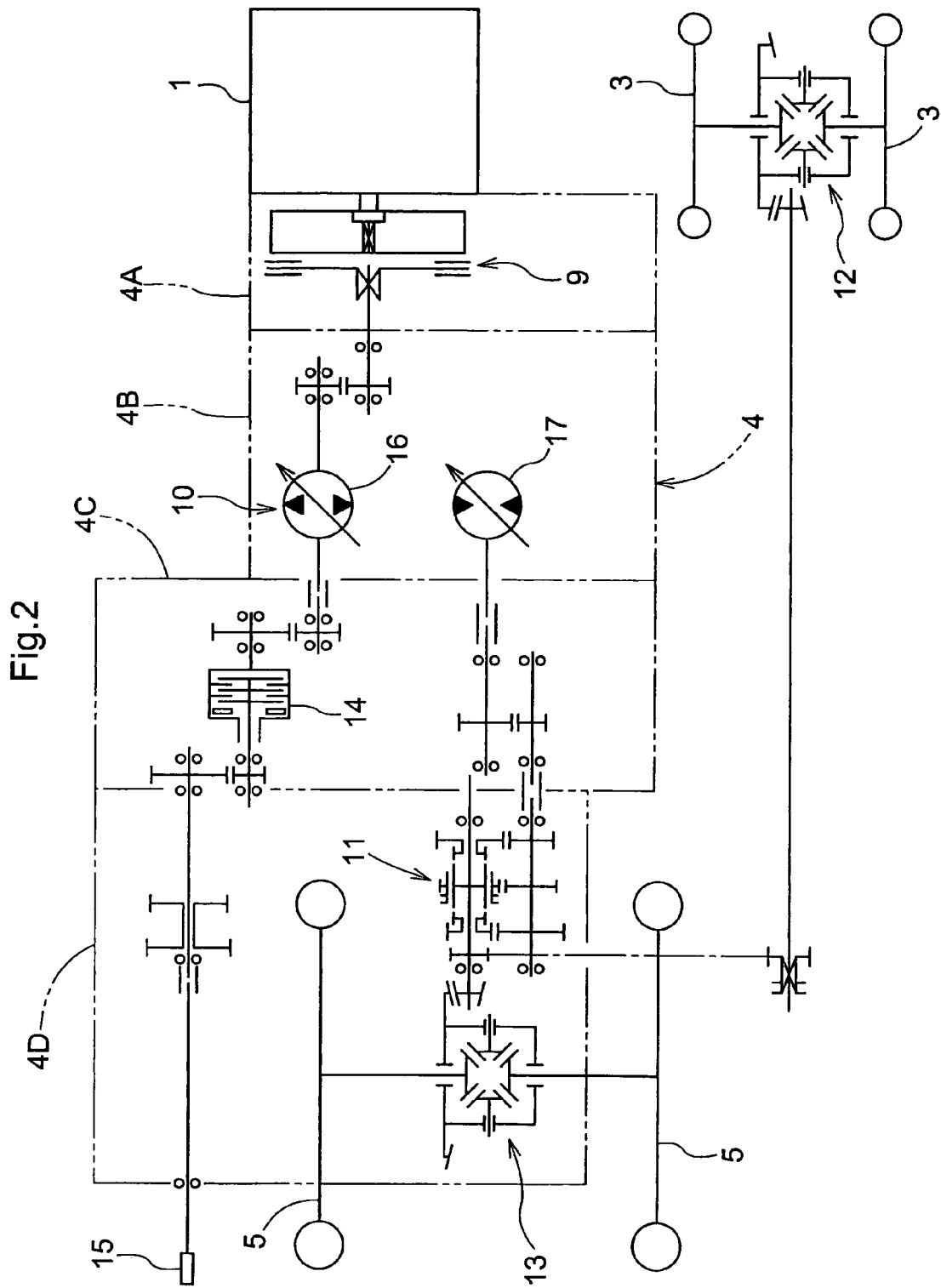
FIG. 2 is a schematic diagram showing the drive train of the tractor.
Figure 3:
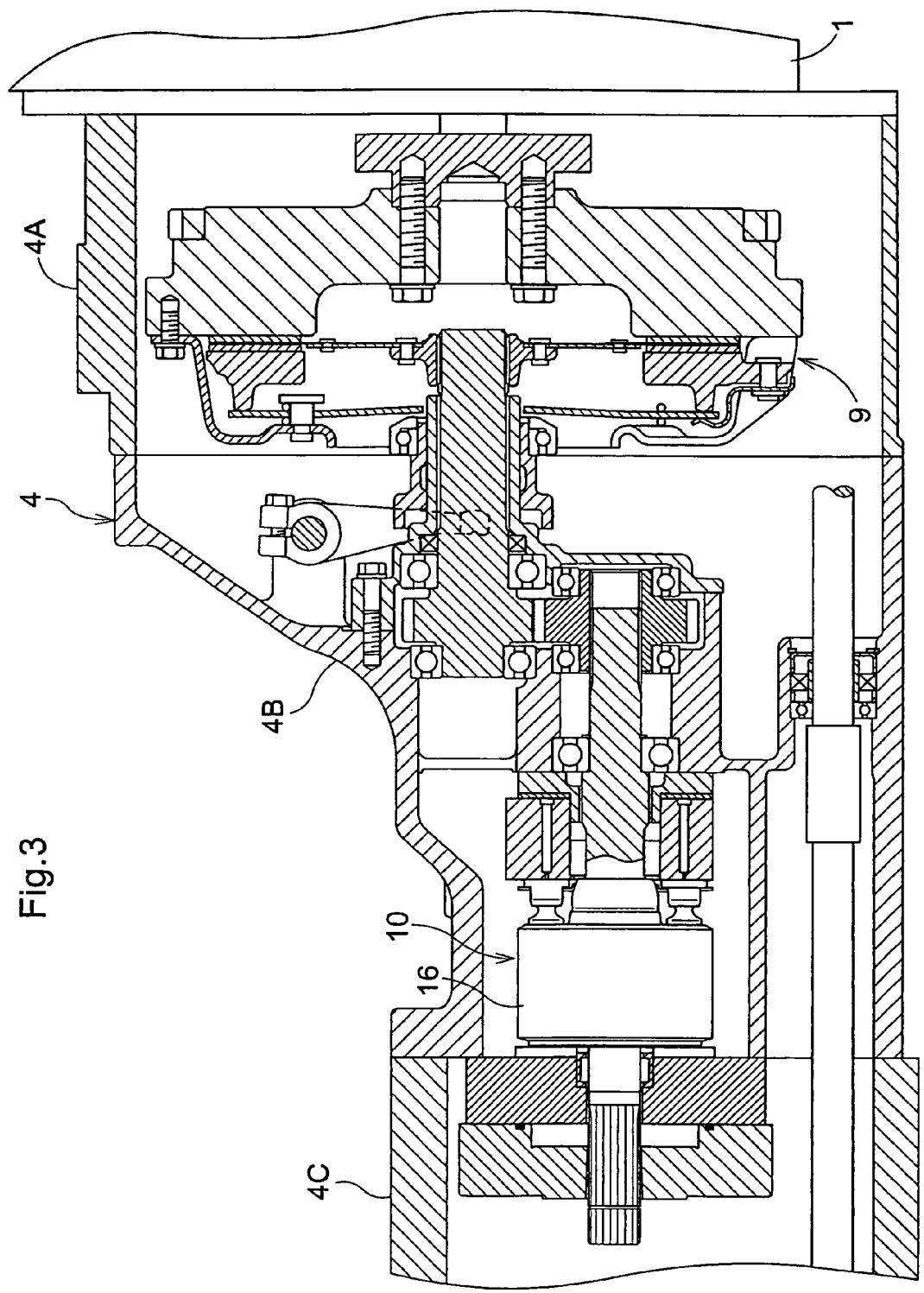
FIG. 3 is a sectional side view showing a part of the drive train of the tractor.
Figure 4:
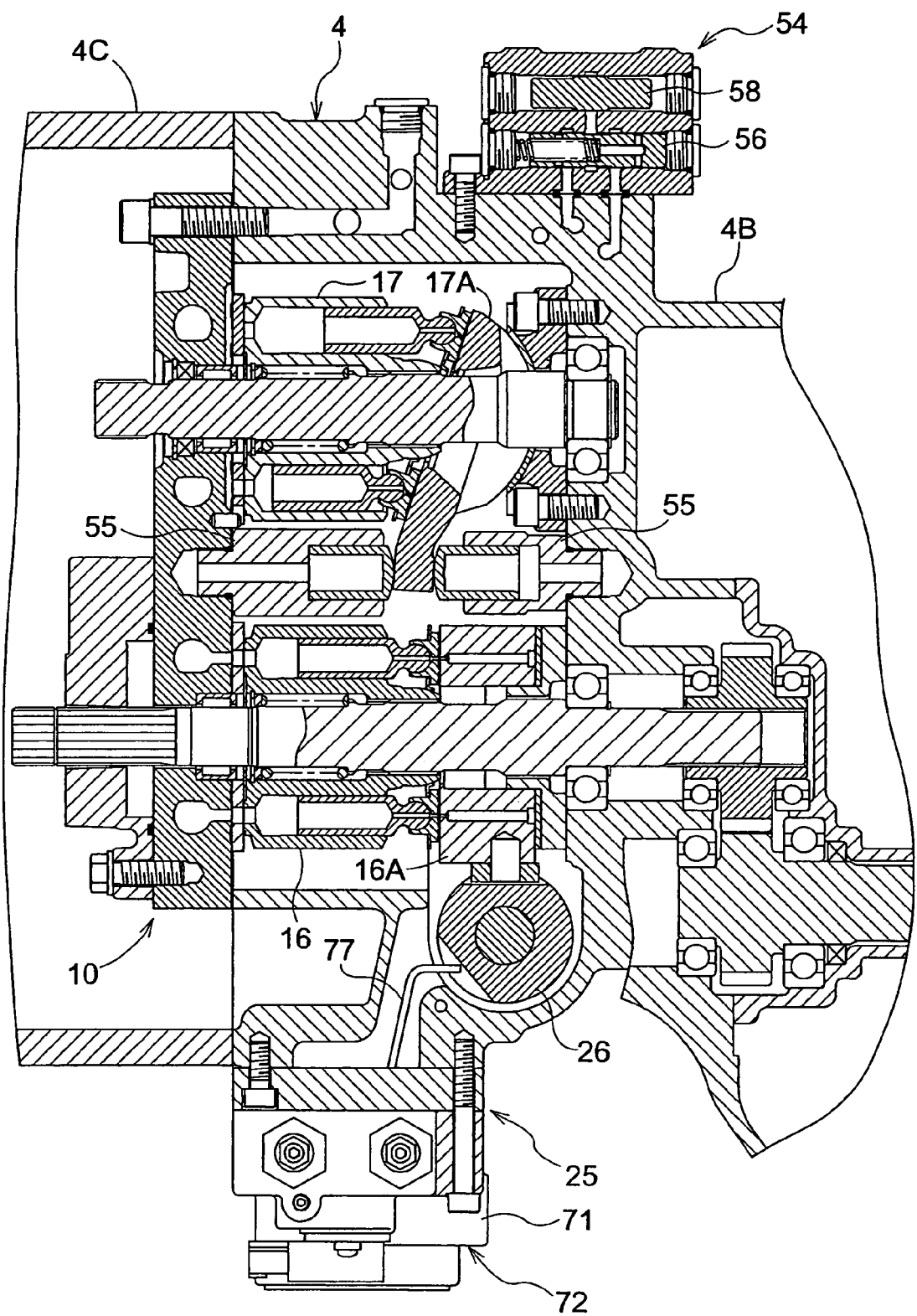
FIG. 4 is a sectional plan view showing a part of the drive train of the tractor.

As shown in FIGS. 2-4, the power from the engine 1 is transmitted to the hydrostatic continuously variable speed change device (an example of a continuously variable speed change device) 10 which functions as a main speed change apparatus through the dry-type main clutch 9 etc. The driving power from the hydrostatic continuously variable speed change device 10 is transmitted to the right and left front wheels 3 and the right and left rear wheels 5 through the gear type speed change device (an example of a stepwise change speed device) 11 which functions as an auxiliary speed change device that can be shifted to three speed positions, high, medium, and low speed positions, the differential gear 12 for front wheels, or the differential gear 13 for rear wheels. The power for an operation taken from the hydrostatic type continuously variable speed change device 10 is transmitted to power take off axis 15 via hydraulic operation clutch 14 etc.

Transmission case 4 is formed by connecting the four casing parts: the first casing part 4A that houses the main clutch 9 etc., the second casing part 4B that houses hydrostatic type continuously variable speed change device 10 etc., the third casing part 4C that houses operation clutch 14 etc., and the fourth casing part 4D that houses gear type speed change device 11 etc.

As shown in FIGS. 2-5, hydrostatic type continuously variable speed change device 10 has a axial plunger type variable displacement pump 16, axial plunger type variable displacement motor 17, etc. which are housed in the second casing part 4B, where the power from variable displacement pump 16, which is not speed-changed, is outputted as power for an operation and the speed-changed power from variable displacement motor 17 is outputted as power for traveling. The charge oil from charge pump 21 driven by the engine power is supplied to closed circuit 20 via charge oil path 22, check valve 23, etc. which is formed by connecting the variable displacement pump 16 and the variable displacement motor 17 with the first oil path 18 and the second oil path 19.

As shown in FIGS. 1, and 4-6, this tractor is equipped, in its operator's station 8, with a servo control mechanism 25 with which swash plate (referred to as a pump swash plate hereinafter) 16A of variable displacement pump 16 is operated, based on operation of the speed change pedal (an example of speed change operating element) 24 which is urged toward its neutral position.

Figure 5:
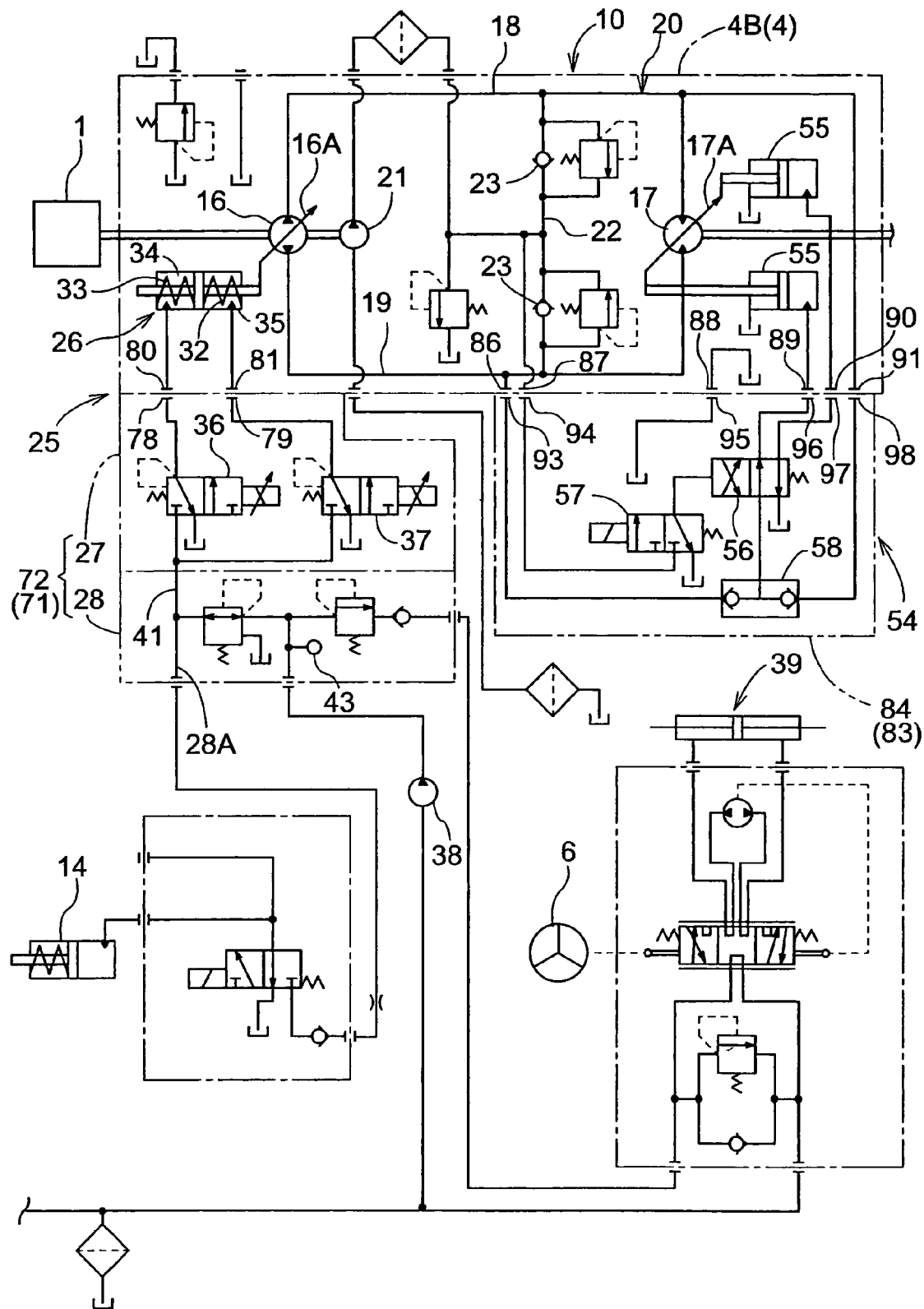
FIG. 5 is a diagram showing the hydraulic circuit.
Figure 6:
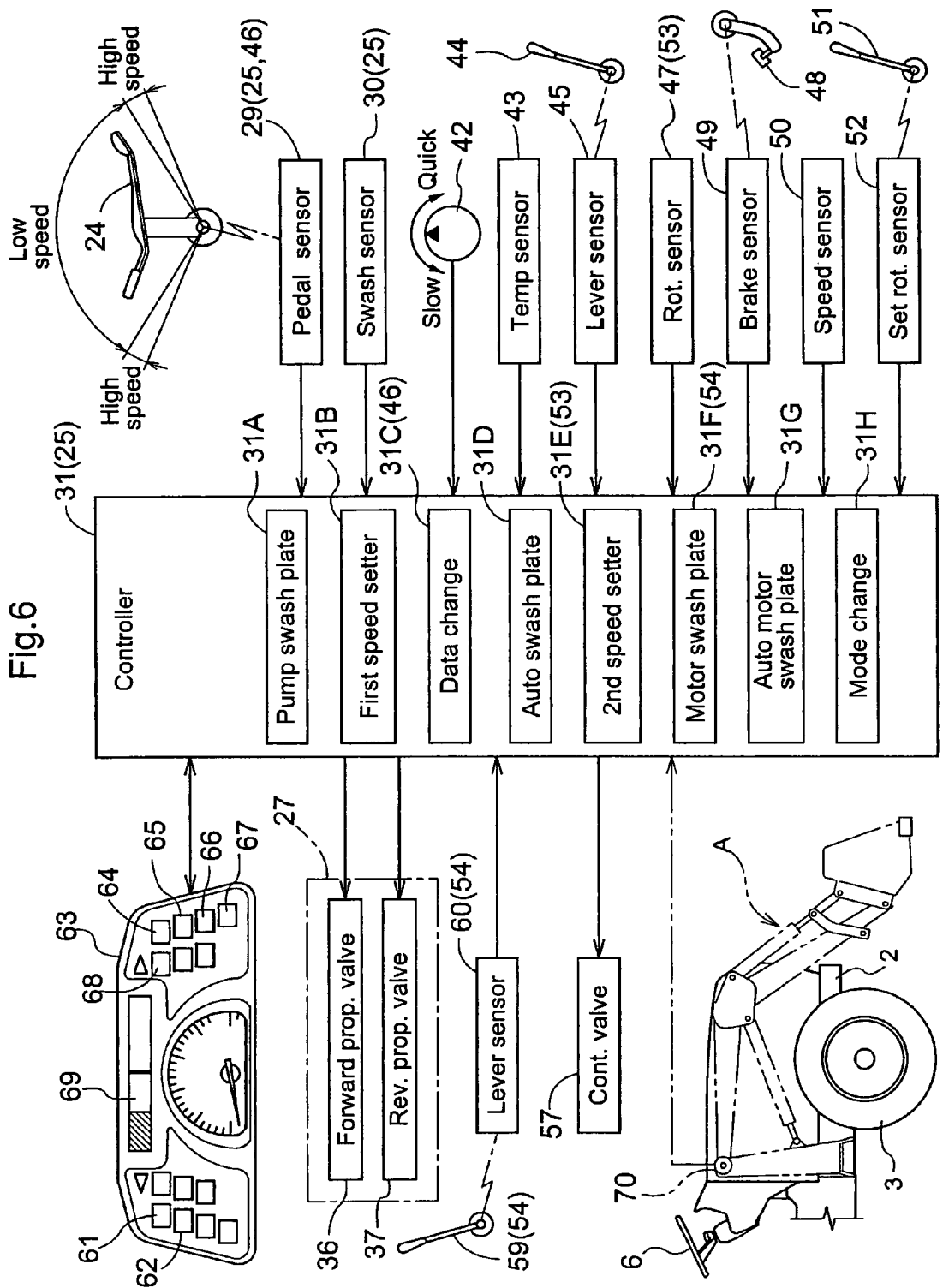
FIG. 6 is a block diagram showing the control structure.

As shown in FIGS. 4-6, the servo control mechanism 25 has hydraulic pump cylinder 26 for continuously operating the pump swash plate 16A (an example of a operating means), a servo valve 27 which regulates flow of the hydraulic fluid to the hydraulic pump cylinder 26, a regulator valve 28 that maintains the hydraulic pressure to the serve valve 27 at a predetermined value, a pedal sensor (an example of an operation position detecting means) 29 which has a potentiometer to detect the operated position of the speed change pedal 24, and a swash plate sensor (an example of a speed change position detecting means) 30 which has a potentiometer which detects the operation position of pump swash plate 16A from the amount of operation of the pump cylinder 26, and a control device (an example of a control means) 31 which has a microcomputer to which detected information from the sensors such as the pedal sensor 29, the swash plate sensor 30, etc. are inputted.

The pump cylinder 26 is housed in the second casing part 4B with a forward travel decelerating spring 32 and reverse travel decelerating spring 33 that urge the swash plate 16A toward its neutral position. As hydraulic fluid is supplied to hydraulic chamber 34 for forward travel gear change, the pump swash plate 16A is operated to a forward travel speed-increase (or accelerating) direction against the urging force of the forward travel decelerating spring 32. As hydraulic fluid is supplied to the hydraulic chamber 35 for reverse travel speed changes, pump swash plate 16A is operated to a reverse travel speed-increase direction against the travel decelerating spring 33.

The servo valve 27 has an electromagnetic proportional valve 36 for forward travel to control a flow of hydraulic fluid to the hydraulic chamber 34 for forward travel of the pump cylinder 26 and an electromagnetic proportional valve 37 for reverse travel which controls a flow of the hydraulic fluid to the hydraulic chamber 35 for the reverse travel speed changes of the pump cylinder 26. The regulator valve 28 distributes the hydraulic fluid fed from supply pump 38 for power steering to operation clutch 14 and hydraulic power steering device 39 with pressure suitable for each operation. The supply oil path 41 to servo valve 27 is connected to the pressure port 28A of the regulator valve 28 to which the supply oil path 40 to operation clutch 14 is connected.

Control device 31 has at least a MPU, memory, and other known hardware required to perform communication function, and other functions and algorithms described in the specification. As shown in FIG. 6, the control device 31 has the map data (an example of correlation data) which correlates the operated position (or actuation position) of speed change pedal 24, with the operation position of pump swash plate 16A, and pump swash plate control means 31A which has the control program which operates pump swash plate 16A by controlling the operation of proportional valve 36 for forward travel, or proportional valve 37 for reverse travel based on the map data and detected information or signals from the pedal sensor 29, detected information from the swash plate sensor 30, etc.

Figure 7:
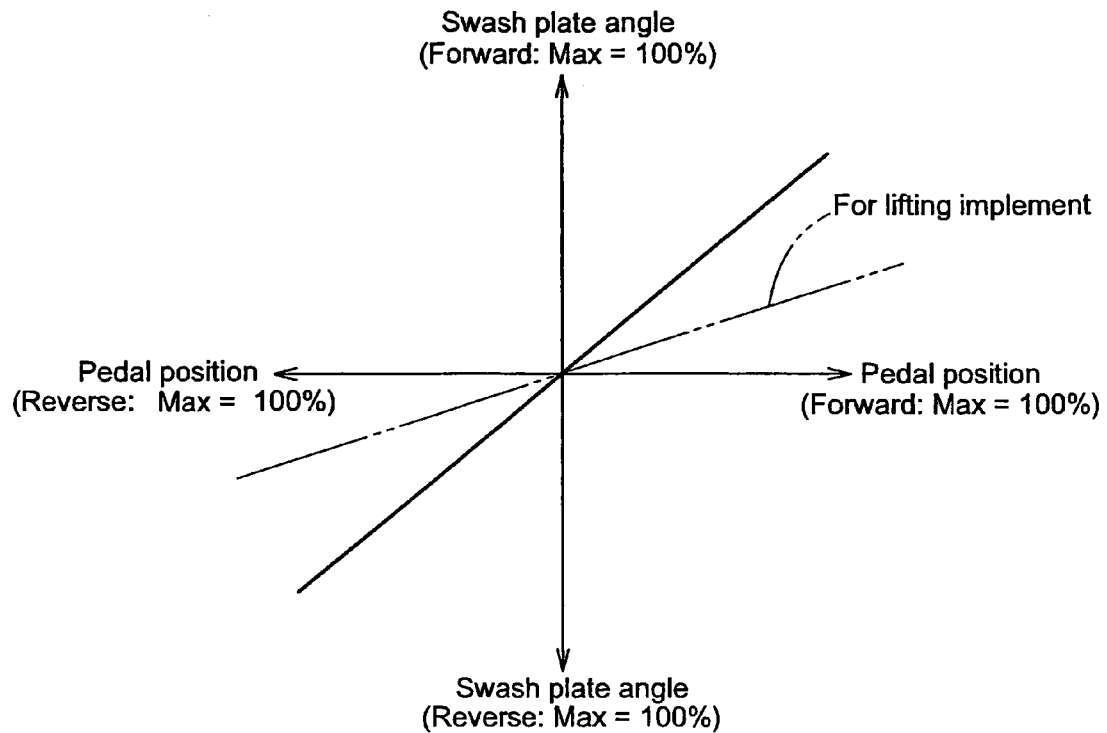
FIG. 7 is a graph showing a correlation between the operated positions of the speed change pedal and the operated positions of the pump swash plate.

The map data of pump swash plate control means 31A makes the correspondence between the operated position of speed change pedal 24 and the operation position of pump swash plate 16A such that the greater the amount of operation from the neutral position of speed change pedal 24 to a forward travel speed-increase direction is, the greater the amount of operation from the neutral position of pump swash plate 16A to a forward travel speed-increase direction is, and such that the greater the amount of operation from the neutral position of speed change pedal 24 to a reverse travel speed-increase direction is, the greater the amount of operation from the neutral position of pump swash plate 16A to a reverse travel speed-increase direction is (See FIG. 7).

The control program of pump swash plate control means 31A sets the operation position of pump swash plate 16A corresponding to the operated position of speed change pedal 24 which pedal sensor 29 detected, as the target operation position of pump swash plate 16A based on the stored map data and the detected information from pedal sensor 29.

Based on the set target operation position and the detected information from swash plate sensor 30, the operation of the proportional valve 36 for forward travel and the proportional valve 37 for reverse travel is controlled such that the target operation position of pump swash plate 16A and the actual operation position come into agreement. By this control operation, the vehicle can be moved forward or reversed at the speed in accordance with the operated position of speed change pedal 24.

That is, the servo control mechanism 25 is an electronically controlled type where the pump swash plate control means 31A controls the operation of proportional valve 36 for forward travel, or proportional valve 37 for reverse travel to operate the pump cylinder 26 in order to operate the pump swash plate 16A of the hydrostatic type continuously variable speed change device 10 based on detected information from pedal sensor 29, and detected information from swash plate sensor 30. The servo control mechanism 25 drives pump cylinder 26 directly with the output pressure of the proportional valve 36 for forward travel or proportional valve 37 for reverse travel which goes through pressure port 28A of regulator valve 28 (direct-acting type).

A stable servo pilot pressure can be obtained and operation control of pump cylinder 26 can be performed with sufficient accuracy, compared with an arrangement where the pump cylinder 26 is driven with the output pressure from charge oil path 22 where pressure changes due to the pressure fluctuation in closed circuit 20 of hydrostatic type continuously variable speed change device 10, or changes in engine rotation rate. As a result, vehicle speed control which effects forward travel or reverse travel at speed in accordance with the operated position of speed change pedal 24 with sufficient accuracy based on detected information from pedal sensor 29, and detected information from swash plate sensor 30 while utilizing a direct-acting type servo control mechanism 25, which is relatively inexpensive.

The control device 31 has; an operation program which computes the deviation between the target operation position of the pump swash plate 16A determined by the pump swash plate control means 31A and the actual operation position based on the target operation position of pump swash plate 16A and the detected information from swash plate sensor 30; a plurality of map data (an example of correlation data) which correlates the deviation of the target operation position of pump swash plate 16A with the actual operation position and the operating speed of pump swash plate 16A; and the first operating speed setting means 31B has the control program which sets the target operating speed of pump swash plate 16A based on those map data and calculated result of the operation program.

Figure 8:
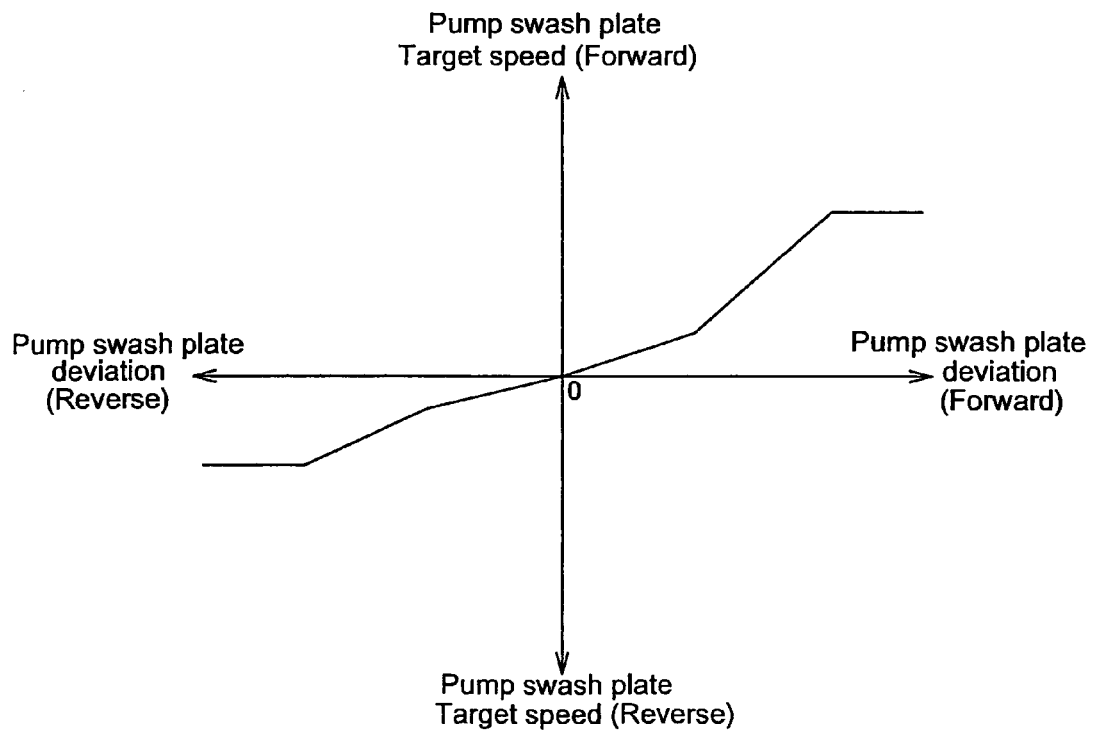
FIG. 8 is a graph showing a correlation between deviations of the swash plate and target operation speeds.

Each map data of the first operating speed setting means 31B correlates the deviation of pump swash plate 16A with the operating speed of pump swash plate 16A (refer to FIG. 8) such that when there is a large deviation between the actual operation position of pump swash plate 16A detected by swash plate sensor 30 and the target operation position of pump swash plate 16A determined by the pump swash plate control means 31A, the operating speed of the pump swash plate 16A becomes greater, and such that operating speed of pump swash plate 16A for a given deviation of the pump swash plate 16A in reverse travel is less than the operating speed of pump swash plate 16A for a given deviation of pump swash plate 16A in a forward travel.

The control program of the first operating speed setting means 31B is set up such that the operating speed of pump swash plate 16A corresponding to the deviation of computed pump swash plate 16A is set as the target operating speed of pump swash plate 16A based on the map data and the calculation result of the operation program. And the set target operating speed is output to the pump swash plate control means 31A.

In vehicle speed control, the control program of the pump swash plate control means 31A controls the operation of the proportional valve 36 for forward travel, or proportional valve 37 for reverse travel such that the pump swash plate 16A is operated at the target operating speed set by the first operating speed setting means 31B. By this control operation, hunching can be controlled while improving response property of the pump swash plate 16A to the operation of speed change pedal 24. As a result, the vehicle speed can reach the speed set by the operated position of speed change pedal 24 quickly and accurately. Since the operating speed of pump swash plate 16A in reverse travel is less than the operating speed of pump swash plate 16A during a forward travel, and the speed change operation of the hydrostatic type continuously variable speed change device 10 in a reverse travel is performed more gradually compared with a speed change operation of the hydrostatic type continuously variable speed change device 10 during a forward travel, it becomes easy to perform speed change operation of hydrostatic type continuously variable speed change device 10 during a reverse travel when it is difficult to have a sense of speed compared with during a forward travel.

The control device 31 has data change means 31C provided with the control program which changes the map data which the first operating speed setting means 31B uses. As described below, data change means 31C is set up such that the map data which the first operating speed setting means 31B uses is changed appropriately according to various situations.

The data change means 31C changes the map data which correlates the deviation of pump swash plate 16A with the operating speed of pump swash plate 16A based on the operated position of regulation dial (an example of an operator-manipulated control) 42 which has a potentiometer in the operator's station 8 such that as the regulation dial 42 is operated more toward the quick side from the reference position, operation of pump swash plate 16A is performed more promptly by changing the map such that the deviation of pump swash plate 16A corresponds with the operating speed of pump swash plate 16A such that the operating speed of pump swash plate 16A for a given deviation of the pump swash plate 16A becomes more rapid. Also, as the regulation dial 42 is operated more toward a slow side from the reference position, the operating speed of pump swash plate 16A to the deviation of pump swash plate 16A is less so that the operation of pump swash plate 16A is performed more gradually.

That is, by operating the regulation dial 42, a response to a gear change operation of the hydrostatic type continuously variable speed change device 10 by speed change pedal 24 may be changed according to the liking of a driver, resulting in an improved speed change characteristics.

The data change means 31C changes the map data based on detected information from oil temperature sensor 43 by which the temperature of the hydraulic fluid supplied to regulator valve 28 is detected, such that operating speed of pump swash plate 16A is correlated with a given deviation of pump swash plate 16A so that the operating speed of pump swash plate 16A for the deviation of pump swash plate 16A is gradual in response to a fall of oil temperature so that the lower the temperature of hydraulic fluid is, more gradually the operation of pump swash plate 16A is performed.

That is, the system takes into consideration that the viscosity of hydraulic fluid becomes high and the response of pump swash plate 16A becomes more sluggish with a fall of the hydraulic fluid temperature. The target operating speed of pump swash plate 16A is set lower with a lower temperature of hydraulic fluid. This can help prevent hunching resulting from the fall in the response of the pump swash plate 16A, which is more likely to happen when temperature of hydraulic fluid is not taken into consideration and when the temperature of hydraulic fluid is low.

The data change means 31C changes the map data which correlates the deviation of pump swash plate 16A with the operating speed of pump swash plate 16A based on detected information from sub-gear change sensor (an example of a gear ratio detection means) 45 which has a potentiometer which detects the gear ratio of the gear type speed change device 11 based on the operation position of sub-gearshift lever 44 in the operator's station 8, such that the higher the gear ratio of the gear type speed change device 11 is, the greater is the speed at which the operation of pump swash plate 16A is performed. Therefore, the means 31C modifies the map that correlates the deviation of pump swash plate 16A with the operating speed of pump swash plate 16A such that the operating speed of pump swash plate 16A for a given deviation of pump swash plate 16A is greater in response to increase in the gear ratio of the gear type speed change device 11.

That is, the target operating speed of pump swash plate 16A is set at a higher speed in consideration of the fact that the reaction to operation of pump swash plate 16A becomes slower, as the gear ratio of gear type speed change device 11 is set to the higher speed side. Thus, irrespective of the gear ratio of gear type speed change device 11, the response during a gear change operation of the hydrostatic type continuously variable speed change device 10 by speed change pedal 24 is consistent.

The data change means 31C changes the map to be used to data which correlates the deviation of pump swash plate 16A with the operating speed of pump swash plate 16A such that the slower the operating speed of speed change pedal 24 is, the more gradually the pump swash plate 16A is operated, based on the detected information from the operating speed detection means 46 which detects the operating speed of speed change pedal 24, such that with a decrease in the operating speed of speed change pedal 24, the operating speed of the pump swash plate 16A for a given deviation of pump swash plate 16A becomes more gradual. The operating speed of speed change pedal 24 is obtained by differentiating the output of pedal sensor 29 with respect to time. Therefore, the detection means 46 is considered to have the pedal sensor 29 and the control device 31.

As a result, even if the speed change pedal 24 is operated very slowly, the movement of the pump swash plate 16A lags behind the operation of speed change pedal 24. Thus, since the possibility that operation of pump swash plate 16A follows the operation of speed change pedal 24 causing a stepwise speed change can be avoided, a smooth gear change operation of hydrostatic type continuously variable speed change device 10 by speed change pedal 24 can be performed irrespective of the operating speed of speed change pedal 24.

The operating speed detection means 46 has the pedal sensor 29 and the operation program, which data change means 31C has, to calculate the operating speed of speed change pedal 24 based on detected information from the pedal sensor 29.

The data change means 31C changes the map data to be used into the map data which correlates the deviation of pump swash plate 16A with the operating speed of pump swash plate 16A based on detected information from swash plate sensor 30 such that when it is detected that the operation position of pump swash plate 16A is near the neutral position or at the neutral position, operation of pump swash plate 16A is performed gently so that the operating speed of pump swash plate 16A for a given deviation of pump swash plate 16A is restricted to the low speed side.

As a result, when pump swash plate 16A is located near the neutral position or at the neutral position, even if the speed change pedal 24 is suddenly depressed, since pump swash plate 16A is not quickly operated in the speed increase direction with the step in operation, the pump swash plate 16A is operated in the speed increase direction gently. Thus even if the step in operation of the speed change pedal 24 is carried out very rapidly, a smooth start is ensured without a sudden start or a sudden acceleration from a very slow speed.

The data change means 31C changes the used map data which correlates the deviation of pump swash plate 16A with the operating speed of pump swash plate 16A based on the detected information from rotation sensor (an example of a load detection means) 47 which detects the engine rotational speed, and the target operation position of pump swash plate 16A set up by pump swash plate control means 31A, such that when the target operation position of pump swash plate 16A is set to the low speed side when the engine rotational speed is low, operation of pump swash plate 16A is performed quickly, such that, in response to the fall of the engine rotational speed, the operating speed of pump swash plate 16A for a given deviation of pump swash plate 16A becomes greater. The map data is changed such that when it is detected that the target operation position of pump swash plate 16A was set to the high speed side when the engine rotational speed is raising, the operation of pump swash plate 16A is performed gently so that the operating speed of pump swash plate 16A for a given deviation of the pump swash plate 16A becomes slow in response to the rise of the engine rotational speed.

If the speed change pedal 24 is operated to the decelerating side when the engine rotational speed is low due to increase of traveling load etc., the pump swash plate 16A is operated quickly to the decelerating direction in response to the operation, mitigating the excess engine load. This reduces the problem of an engine stall in spite of the speed change pedal 24 operated in the decelerating direction because reduction of the engine load is too slow due to slow response of the hydrostatic type continuously variable speed change device 10. When the speed change pedal 24 is operated to the accelerating side when the engine rotational speed is raising due to reduction of traveling load etc., since operation to the speed-increase direction of pump swash plate 16A based on the operation is performed gently, the rapid increase of the vehicle speed, resulting from the rapid speed increase operation of the pump swash plate 16A with the increase in the engine rotational speed, is avoided. That is, gear change operation of hydrostatic type continuously variable speed change device 10 by speed change pedal 24 can be performed well irrespective of change in the engine rotational speed.

The data change means 31C changes the map data which correlates the deviation of pump swash plate 16A with the operating speed of pump swash plate 16A based on detected information from the brake sensor (an example of a braking detecting means) 49 which has a potentiometer which detects the operation of brake mechanism (not shown) from the operation position of brake pedal 48 in the operator's station 8, such that when brake mechanism is carrying out the braking operation, operation to the decelerating direction of pump swash plate 16A is performed promptly such that the operating speed of pump swash plate 16A for a given deviation of pump swash plate 16A becomes greater, taking into consideration the fall of the vehicle speed by the braking operation of brake mechanism.

This prevents the interference between the hydrostatic type continuously variable speed change device 10 and the brake mechanism during the braking operation when the step in operation of speed change pedal 24 is ceased and the step in operation of the brake pedal 48 is performed. Thus this helps increase operating life of the hydrostatic type continuously variable speed change device 10 as well as the brake mechanism.

The data change means 31C changes the map data which correlates the deviation of pump swash plate 16A with the operating speed of pump swash plate 16A based on the detected information from the vehicle speed sensor (speed detecting means) 50 which detects the vehicle speed from the output rotational speed of gear type speed change device 11, such that when the vehicle speed is low, the operating speed of pump swash plate 16A for a given deviation of pump swash plate 16A is performed slowly so that operation of pump swash plate 16A is gradual in response to the fall of the vehicle speed.

When traveling at low speed, the response of pump swash plate 16A to an operation of speed change pedal 24 becomes less sensitive, making it easier to perform an inching operation of the vehicle speed required at low speed.

The data change means 31C changes the map data which correlates the deviation of the pump swash plate 16A with the operating speed of the pump swash plate 16A based on detected information from the swash plate sensor 30, and the target operation position of pump swash plate 16A set by the pump swash plate control means 31A, such that when the target operation position of the pump swash plate 16A is set to the speed increase side relative to the actual operation position, operation of pump swash plate 16A is performed more gently, and such that when the target operation position of pump swash plate 16A is set to the slowdown side relative to the actual operation position, operation of pump swash plate 16A is performed promptly, and such that when the neutral position is between the target operation position of pump swash plate 16A and the actual operation position, operation of pump swash plate 16A is performed much more promptly.

Therefore, depending on the relationship of the target operation position of pump swash plate 16A, and the actual operation position, the operating speed of pump swash plate 16A for a given deviation of pump swash plate 16A changes.

The responses to the speed increase operation and slowdown operation of the hydrostatic type continuously variable speed change device 10 by speed change pedal 24 may be made different by this method. Since the increase of the engine load by a speed increase operation of hydrostatic type continuously variable speed change device 10 is reduced and the engine load by a slowdown operation of hydrostatic type continuously variable speed change device 10 is reduced, an engine stall due to a gear change operation of the hydrostatic type continuously variable speed change device 10 by the speed change pedal 24 during high load can be effectively prevented. Since the operation delay of the pump swash plate 16A in response to an operation of the speed change pedal 24 is prevented, speed change operation of the hydrostatic type continuously variable speed change device 10 in the forward or the reverse direction by the speed change pedal 24 can be performed comfortably.

The data change means 31C changes the map data which correlates the deviation of the pump swash plate 16A with the operating speed of pump swash plate 16A based on detected information from swash plate sensor 30, and the target operation position of the pump swash plate 16A set by the pump swash plate control means 31A such that at the start of the vehicle movement where the pump swash plate 16A is operated in the speed increase direction from the neutral position, the operation of pump swash plate 16A is performed gently, such that the operating speed of pump swash plate 16A for a given deviation of pump swash plate 16A becomes slower at the start of travel and such that when the vehicle is stopped where a slowdown operation of the pump swash plate 16A is carried out from a speed increase position to the neutral position, operation of the pump swash plate 16A is performed with greater speed, so that at the time of the vehicle stop, the operating speed of pump swash plate 16A for a given deviation of pump swash plate 16A becomes quicker.

This allows the changes in the response to the traveling start and a traveling stop by operation of speed change pedal 24. This also helps prevent a possible sudden acceleration at the start of the vehicle movement.

As the map data of the first operating speed setting means 31B, a map data for the forward travel for the gear change operating speed at the time of a forward travel, and a map data for the reverse travel for the gear change operating speed at the time of a reverse travel may be separately provided so that the data change means 31C has different map data to be used based on detected information from the pedal sensor (forward reverse travel detection means) 29.

When the forward travel decelerating spring 32 and the reverse travel decelerating spring 33 perform neutral return operation (slowdown operation) of the pump swash plate 16A, the inertia at the time of a trailer operation etc. may make it hard to perform the slowdown operation toward the neutral position of pump swash plate 16A despite the slowdown operation of speed change pedal 24.

Thus despite the deceleration operation of the speed change pedal 24 based on detected information from the pedal sensor 29, and detected information from the swashplate sensor 30, when it is detected that deceleration operation of the pump swash plate 16A with the forward travel decelerating spring 32 or the reverse travel decelerating spring 33 is not performed, the pump swash plate control means 31A controls the actuation of the proportional valve 36 for forward travel or the proportional valve 37 for reverse travel on the side opposite to the side used to actuate the pump swash plate 16A to the present actuation position. Thus the pump cylinder 26 is forced to operate in the direction in which deceleration operation of the pump swash plate 16A is carried out toward the neutral position.

As a result, even if the pump swash plate 16A does not decelerate despite the rate at which the speed change pedal 24 is operated is slowed down due to inertia for example during a trailer operation etc., deceleration operation of the pump swash plate 16A can be carried out by a forced operation of the pump cylinder 26 by the operation control of the proportional valve 36 for forward travel or the proportional valve 37 for reverse travel by the pump swash plate control means 31A.

Figure 9A:
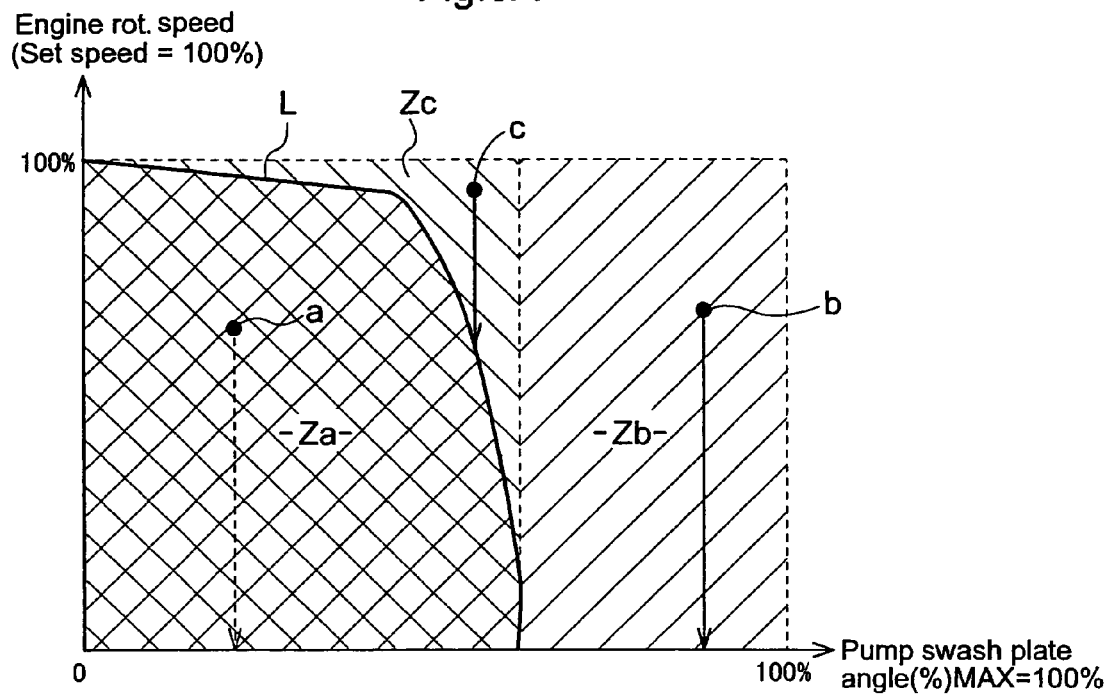
FIG. 9 is a graph showing a correlation between positions of the swash plate and engine rotation rates.

The engine stall performance of the work vehicle carrying the hydrostatic type continuously variable speed change device 10 is shown in FIG. 9(A). This engine stall performance is determined by the output torque of an engine 1, the pressure of the hydrostatic type continuously variable speed change device 10, and the actuation position (swash-plate angle) of the pump swash plate 16A.

The line L shown in FIG. 9(A) is an engine stall performance line where the engine rotational speed and the shift operation position of the pump swash plate 16A balance at the time of the maximum load to the hydrostatic type continuously variable speed change device 10 at which a high pressure relief of the hydrostatic type continuously variable speed change device 10 releases pressure due to running load.

In FIG. 9(A), the engine rotational speed is shown with respect to the set rotating speed at 100%, and the actuation position of the pump swash plate 16A shown with respect to 100% for the maximum accelerating position (the maximum swash-plate angle).

The engine stall performance of the work vehicle carrying the hydrostatic type continuously variable speed change device 10 is explained with reference to FIG. 9(A). When the operation load for driving implements etc. other than running load is applied to the engine 1 with the pump swash plate 16A held at a certain actuation position, as point a shows, the engine rotational speed and the actuation position of the pump swash plate 16A may go into the region Za inside the engine stall performance line L.

In this case, when the operation load other than running load etc. is stable, even if running load increases, the engine rotational speed does not fall. But if the operation load other than running load etc. increases, the engine rotational speed will drop and an engine 1 will stop or stall.

With the pump swash plate 16A held at a certain actuation or operation position, as shown at point b, when the engine rotational speed and the actuation position of the pump swash plate 16A are located in the region Zb outside the engine stall performance line L, if running load increases, the engine rotational speed will fall and an engine 1 will stop.

With the pump swash plate 16A held at a certain actuation position, when the engine rotational speed and the actuation position of the pump swash plate 16A are located in region Zc, as shown by point c, if the running load increases, the engine rotational speed falls until it arrives at the engine stall performance line L. As it reaches the engine stall performance line L, the engine rotational speed will be stabilized.

The engine stall performance line L is such that as the output of the engine 1 decreases, the actuation position of the pump swash plate 16A for a given engine rotational speed in FIG. 9(A) becomes smaller.

That is, the smaller the output of the engine 1 is, more likely the engine stall becomes due to overload when accelerating by stepping in the speed change pedal 24 when traveling with large running load, or when climbing up a hill.

To solve this problem, as shown in FIG. 6, the control device 31 has the automatic pump swash plate control means 31D which changes the actuation position of the pump swash plate 16A based on the engine load.

Figure 9B:
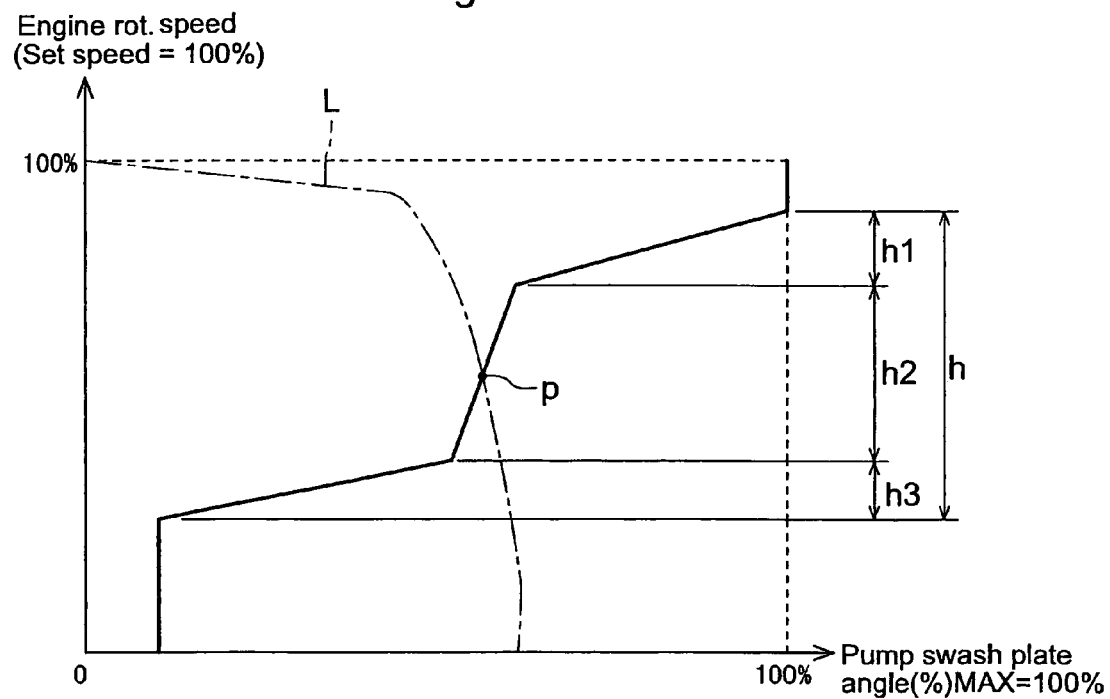

As shown in FIGS. 6 and 9(B), the automatic pump swash plate control means 31D has an operation program which computes the decrease amount (engine drop amount) from the set rotating speed of the engine rotational speed based on detected information from the setting rotation sensor (an example of a set-rotating-speed detection means) 52 which has a potentiometer which detects the set rotating speed of an engine 1 from the actuation position of the accelerator lever 51 in the operator's station 8, and on detected information from the rotation sensor 47, a plurality of map data (an example of correlation data) which correlates the engine rotational speed with the actuation position of the pump swash plate 16A, and, a control program which operates the pump swash plate 16A by controlling actuation of the proportional valve 36 for forward travel, or the proportional valve 37 for reverse travel based on the calculation result and the map data of the operation program.

Each map data of the automatic pump swash plate control means 31D is determined based on the engine stall performance line L. And the engine rotational speed and the actuation position of the pump swash plate 16A are correlated such that when the engine rotational speed falls to the predetermined engine rotation region h, the lower the rotation rate is, the closer the limit operation position is to the neutral position and such that the limit operation position of the pump swash plate 16A is not set at the neutral position (see FIG. 9(B)).

To explain in more detail, as shown in FIG. 9(B), in the first region h1 where the engine drop amount is small among the predetermined engine rotation regions, the engine rotational speed and the actuation position of the pump swash plate 16A are correlated such that the amount of change of the pump swash plate 16A is large for a given amount of change of the engine rotational speed.

In the second region h2 where an engine drop amount is larger than the first region hi, the engine rotational speed and the actuation position of the pump swash plate 16A are correlated such that the amount of change of the pump swash plate 16A is small for a given amount of change of the engine rotational speed and so as to have a stabilizing point p where the engine rotational speed does not fall due to running load.

The engine rotational speed and the actuation position of the pump swash plate 16A are correlated in the third region h3 where an engine drop amount is larger than the second region h2, such that the amount of change of the pump swash plate 16A is large for the given amount of change of the engine rotational speed.

The control program of the automatic pump swash plate control means 31D sets the actuation position of the pump swash plate 16A corresponding to the engine drop amount which the operation program computed as the limit operation position of the pump swash plate 16A based on the calculation result and map data of an operation program, and controls actuation of the proportional valve 36 for forward travel or the proportional valve 37 for reverse travel based on the set limit operation position and detected information from the swashplate sensor 30, such that the limit operation position of the pump swash plate 16A comes to agreement with the actual actuation position.

That is, with the automatic pump swash plate control means 31D, when the engine rotational speed falls to the first region h1 due to an increase in the engine load, the load control is performed where driving torque is increased while preventing an engine stall by returning the pump swash plate 16A to the slowdown direction greatly, and reducing the engine rotational drop speed.

When the engine rotational speed falls to the second region h2 despite this load control, the load control can be implemented that prevents an engine stall while prioritizing increasing of drive torque by lowering the decelerating operation amount of the swash plate 16A and increasing the drive torque while allowing the operator to feel the engine load. If the load on the engine is running load, the engine rotation rate will stop decreasing below the stabilizing point p once the rate reaches the point p.

Figure 9C:
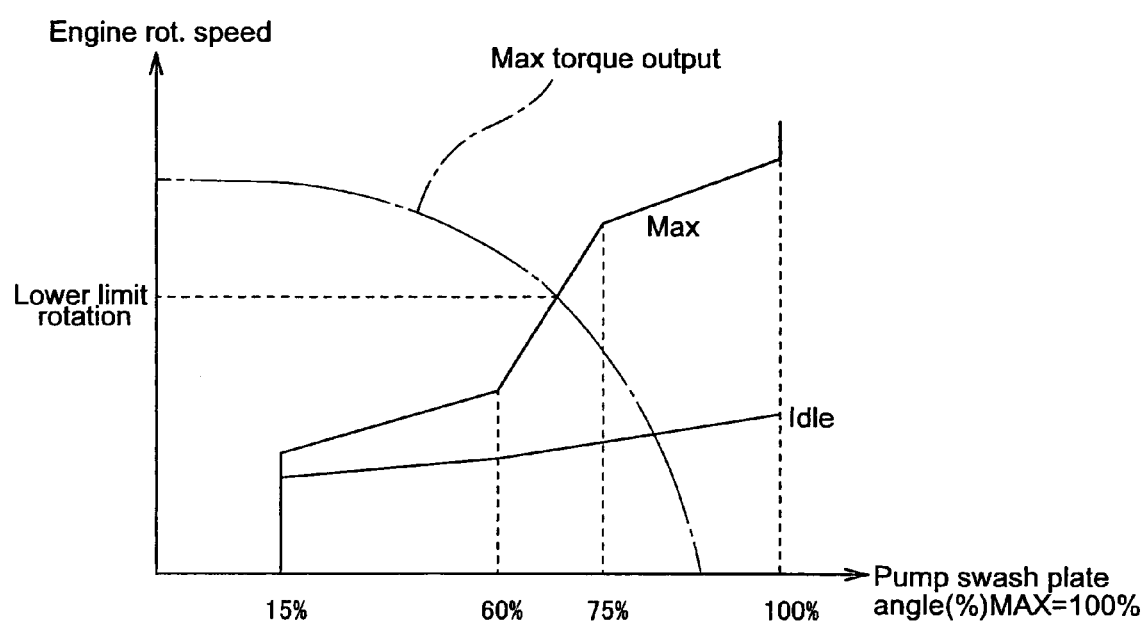
Figure 11:
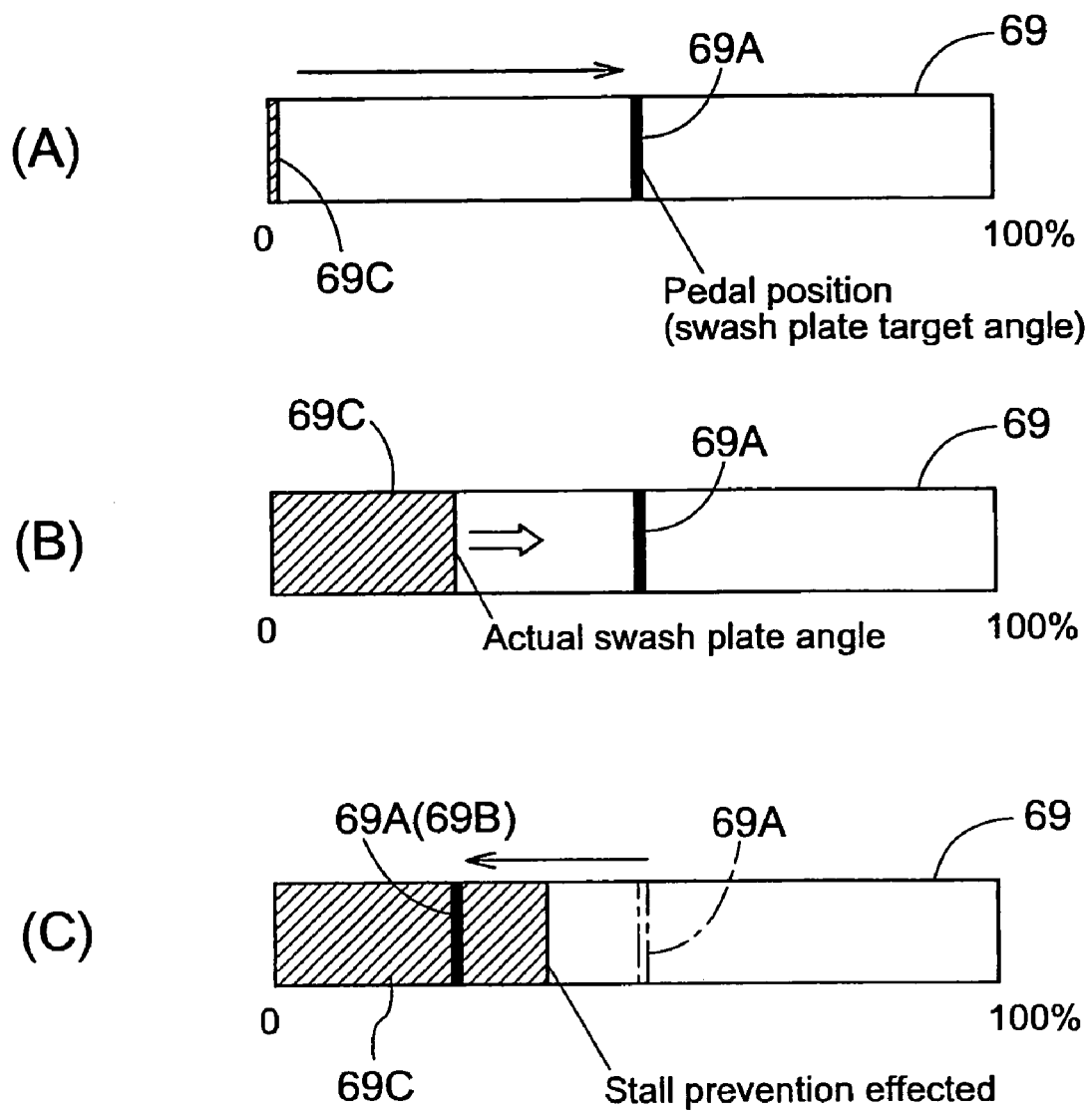
FIG. 11 shows how a pump swash plate position is displayed on a LCD.

The difference between FIG. 9B and FIG. 9C is that the vertical axis in FIG. 9C represents engine rotation rate. Max indicates the setting of the map data for large load and IDL indicates the setting for map data for light load.

When the engine rotational speed falls to the third region h3 due to load other than running load, for example, from a lift actuation of a liftable implement, load control can be implemented that secures driving torque while giving priority to prevention of the engine stall, by returning the pump swash plate 16A in the slowdown direction by a large amount, and reducing the lowering speed of the engine rotational speed.

With this control, a load control that prevents an engine stall due to overload can be performed during a loader operation where a front loader A is connected to the tractor or during a tilling operation where the tilling apparatus is connected to the tractor etc., even if the operator performs shift operation without consideration to an operation load etc. Thus, improvement in the response in the system may be expected.

Moreover, since the limit operation position of the pump swash plate 16A is never set at the neutral position, the pump swash plate 16A is not returned to the neutral position by this load control. Therefore, a possibility of the pump swash plate 16A returning to the neutral position, and the vehicle unintentionally starting to run backwards by the load control during an uphill climb will be avoided.

The control device 31 has a plurality of map data that correlates the rate of change of the engine rotational speed with the operation speed of the pump swash plate 16A. It has a second operation speed setting means 31E that has a control program which sets the target operation speed for the pump swash plate 16A, based on those map data and detected information from a variation speed detection means 53 that detects the rate of change of the engine rotational speed.

Each map data of the second operation speed setting means 31E correlates the rate of change of the engine rotational speed with the operation speed of the pump swash plate 16A such that the greater the rate of change of the engine rotational speed is, greater the operation speed of the pump swash plate 16A becomes.

The control program of the second operation speed setting means 31E sets the operation speed of the pump swash plate 16A corresponding to the rate of change of the engine rotational speed which the rate of change detection means 53 detected as the target operation speed of the pump swash plate 16A, based on the memorized map data and detected information from the variation speed detection means 53 and the set target operation speed is outputted to the automatic pump swash plate control means 31D.

The control program of the automatic pump swash plate control means 31D controls actuation of the proportional valve 36 for forward travel, or the proportional valve 37 for reverse travel such that the pump swash plate 16A is operated at the target operation speed set by the second operation speed setting means 31E. Thus, a good load control taking into consideration the rate of change of the engine rotational speed is possible. Despite changes in the rate of change of the engine rotational speed, driving comfort is maintained during a drop or increase in engine rotation speed. Moreover, deceleration operation of the pump swash plate 16A to lowering of the engine rotational speed can be performed with sufficient response, and the engine stall resulting from the actuation delay of the pump swash plate 16A can be prevented.

The rate of change detection means 53 has the rotation sensor 47, and the operation program of the second operation speed setting means 31E that computes the rate of change of the engine rotational speed based on detected information from the rotation sensor 47.

The data change means 31C has a control program which changes the map data which is used by the automatic pump swash plate control means 31D and the second operation speed setting means 31E. The data change means 31C changes the map data which the automatic pump swash plate control means 31D uses to a map data that correlates the engine rotational speed with the actuation position of the pump swash plate 16A, based on detected information from the set rotation sensor 52, such that the smaller the set rotating speed of an engine 1, the greater the control amount of the pump swash plate 16A for a given change in the engine rotational speed (see FIG. 9). It also changes the map data, which the second operation speed setting means 31E uses, to a map data that correlates the rate of change of the engine rotational speed with the operation speed of the pump swash plate 16A, based on detected information from the sub-gear change sensor 45, such that the lower the gear ratio of the gear type speed change device 11 is, the quicker the actuation of the pump swash plate 16A becomes, and such that the operation speed of the pump swash plate 16A becomes greater for a rate of change of the engine rotational speed with lowering of the gear ratio of the gear type speed change device 11.

That is, a suitable load control is chosen based on the map data in consideration of the set rotating speed of the engine 1. Therefore, irrespective of the set rotating speed of an engine 1, the engine stall due to overload can be effectively prevented.

Depending on the gear ratio of the gear type speed change device 11 which is shifted to a low speed side when performing an operation with a larger load, the map data is set such that the lower the gear ratio is, the greater the operation speed of the pump swash plate 16A for a given rate of change of the engine rotational speed. Therefore, deceleration operation of the pump swash plate 16A can be promptly performed in response to a rapid reduction in engine rotational speed during an operation with a large load. As a result, the engine stall due to overload can be reliably prevented.

While not shown, a manually operated operation speed setting device (operation speed setting means) is provided and has a potentiometer or a switch for setting the target operation speed of the pump swash plate 16A during a load control etc. The automatic pump swash plate control means 31D may be set up such that it controls actuation of the proportional valve 36 for forward travel, or the proportional valve 37 for reverse travel such that the pump swash plate 16A is operated at the target operation speed set by this operation speed setting device in consideration of the operation load which changes depending on the kind of the attached implement.

An operating tool for a data change command (commanding means) which has a potentiometer, a switch, etc., may be provided to the data change means 31C in the operator's station 8, for commanding a change of the map data which the automatic pump swash plate control means 31D or the second operation speed setting means 31E uses. This allows the map data to be changed depending on the attached implement.

This tractor is equipped with a switching mechanism 54 which switches the swash plate (a motor swash plate) 17A of the variable capacity motor 17 between high and low positions.

The switching mechanism 54 has a hydraulic cylinder 55 which operates the motor swash plate 17A, a changeover valve 56 which controls flow of the hydraulic fluid to this cylinder 55, an electromagnetic control valve 57 which operates this changeover valve 56, a high pressure selection valve 58 which enables feeding of the hydraulic fluid from the closed circuit 20 of the hydrostatic type continuously variable speed change device 10 to this control valve 57, a switching lever 59 arranged at the lower left position with respect to the steering wheel 6, a lever sensor 60 which has a switch which detects the actuation position of this switching lever 59, and motor swash-plate control means 31F which the control device 31 has as a control program which performs high-to-low switch actuation of the motor swash plate 17A based on detected information from this lever sensor 60.

The cylinder 55 for motor and the variable capacity motor 17 are removably housed within the second casing part 4B of the transmission case 4.

When the switching lever 59 is operated to a low-speed position based on detected information from a lever sensor 60, the motor swash-plate control means 31F performs high-to-low switching control which switches the motor swash plate 17A from the high-speed position to the low-speed position, and turns on the corresponding indicating lamp 61. And, when the switching lever 59 is operated in a high-speed position, it performs low-to-high switching control which switches the motor swash plate 17A from the low-speed position to the high-speed position, and turns on the corresponding indicating lamp 62.

That is, when the vehicle speed drops substantially due to increase in load during an up hill climb or a field operation with the switching lever 59 set in the high-speed position, the driving force to the right and left front wheels 3 and the right and left rear wheels 5 can be increased by switching the switching lever 59 to a low-speed position from a high-speed position so that the vehicle can keep on climbing or continue with work operation.

The indicating lamps 61 and 62 are arranged in the console panel 63 arranged under the steering wheel 6.

The motor swash-plate control means 31F stores the present actuation position of the pump swash plate 16A in the high-to-low switching control based on detected information from the swash-plate sensor 30, and calculates a slowdown target actuation position of the pump swash plate 16A, and controls actuation of the proportional valve 36 for forward travel or the proportional valve 37 for reverse travel so that deceleration operation of the pump swash plate 16A is carried out at a predetermined operation speed to the computed slowdown target actuation position. The means 31F controls the actuation of the proportional valve 36 or 37 and the control valve 57 such that after the pump swash plate 16A arrives at the slowdown target actuation position, an accelerated return of the pump swash plate 16A to the stored actuation position at the predetermined operation speed and the switch over operation of the motor swash plate 17A from the high speed position to the low speed position at a predetermined speed are perfumed simultaneously (see FIG. 10(A)).

Moreover, in the low-to-high switching control, based on detected information from the swash-plate sensor 30, the present actuation position of the pump swash plate 16A is stored, and the slowdown target actuation position of the pump swash plate 16A is computed. Actuation of the proportional valve 36 for forward travel or the proportional valve 37 for reverse travel and actuation of the control valve 57 are controlled such that deceleration operation of pump swash plate 16A to the computed slowdown target actuation position at the operation speed and switch actuation from a low-speed position to the high-speed position of the motor swash plate 17A at the operation speed are performed simultaneously. Afterward, actuation of the proportional valve 36 for forward travel or the proportional valve 37 for reverse travel is controlled so that the pump swash plate 16A is returned to the memorized actuation position at the predetermined speed. [See FIG. 10(B)]

That is, when switching the motor swash plate 17A to a low-speed position from a high-speed position, by performing not only the switching actuation but also accelerating actuation of the pump swash plate 16A simultaneously, the capacity variation in the variable capacity motor 17 generated by the switching actuation to the low-speed position of the motor swash plate 17A from a high-speed position can be offset by the capacity variation in the variable capacity pump 16 generated by accelerating actuation of the pump swash plate 16A. Moreover, when switching the motor swash plate 17A to a high-speed position from a low-speed position, by performing not only the switch actuation but also a deceleration operation of the pump swash plate 16A simultaneously, the capacity variation in the variable capacity motor 17 generated by the switching actuation to the high-speed position of the motor swash plate 17A from a low-speed position can be offset by the capacity variation in the variable capacity pump 16 generated in connection with the deceleration operation of the pump swash plate 16A. Therefore, the shift shock generated by a switching actuation of the motor swash plate 17A can be alleviated.

In addition, while not shown, a high speed response valve may be used instead of the changeover valve 56. When the motor swash-plate control means 31F performs switch actuation of the motor swash plate 17A, the high speed response valve is duty-controlled such that the operation speed of the motor swash plate 17A may fall so as to slow any capacity variation in the variable capacity motor 17 generated when switching the motor swash plate 17A, which alleviates the shift shock resulting from the capacity variation in the variable capacity motor 17.

When traveling with the motor swash plate 17A switched to the high-speed position, the motor swash-plate control means 31F may perform the high-to-low switching control in conjunction with braking actuation of a braking system based on detected information from the brake sensor 49 so as to improve braking operation.

Also, the motor swash-plate control means 31F may be configured such that it performs the high-to-low switching control when traveling with the motor swash plate 17A switched to the high-speed position based on detected information from the pedal sensor 29, and detected information from the swash-plate sensor 30, irrespective of the deceleration operation of the speed change pedal 24, when it is detected that deceleration operation of the pump swash plate 16A with the forward travel decelerating spring 32 or the reverse travel decelerating spring 33 is not performed so that the high-to-low switching control can perform a deceleration operation if deceleration operation of the pump swash plate 16A is not carried out due to inertia during a trailer operation etc., despite the decelerating operation of the speed change pedal 24.

Furthermore, the motor swash-plate control means 31F may be configured so that it performs the high-to-low switching control based on detected information from the operation speed detection means 46, when the motor swash plate 17A is switched to the high-speed position, and when the operation speed of the speed change pedal 24 is greater than a predetermined operation speed so as to prevent an unexpected start and sudden acceleration.

As shown in FIG. 1, the switching lever 59 is installed such that the operable end is located near the left part of the steering wheel 6. This allows a high-to-low switch operation of the motor swash plate 17A without lifting a hand off the steering wheel 6. Moreover, when the front loader A (refer to FIG. 6) is connected to the tractor, the high-to-low switch actuation of the motor swash plate 17A can be performed without lifting the hand from the control lever for front loader actuation (not shown) arranged on the right-hand side of a steering wheel 6.

As shown in FIGS. 4-6, the control device 31 has an automatic motor swash-plate control means 31G as a control program. Automatic motor swash-plate control means 31G performs automatic high-to-low switching control which switches the motor swash plate 17A to the low-speed position from the high-speed position, and turns on the corresponding indicating lamp 61 when it is detected based on detected information from the pedal sensor 29 that the actuation position of the speed change pedal 24 is operated to the predetermined actuation position or the operation area, when the engine rotational speed is detected to have fallen to the low-to-high switch engine speed near a predetermined maximum torque output rotational frequency, or the low-to-high switch engine-speed region set for a given actuation position of the speed change pedal 24 based on the maximum torque output characteristic of an engine 1, and the engine drop amount computed by the operation program of the automatic pump swash plate control means 31D. The automatic motor swash-plate control means 31G also performs the automatic low-tohigh switching control which switches the motor swash plate 17A to a high-speed position from a low-speed position, and turns on the corresponding indicating lamp 62, when it is detected based on an engine drop amount that the engine rotational speed went up to the low-to-high switch engine speed near a predetermined set rotating speed or the low-to-high switch engine-speed region, and when actuation of the speed change pedal 24 to the actuation position or operation area set up beforehand is detected based on detected information from the pedal sensor 29.

More specifically, if the actuation position of the pedal 24, whose maximum treading-in position is 100%, is 50% or less, for example, automatic high-to-low switching control is performed when the engine rotational speed falls to 85% of the engine speed. If the actuation position of the pedal 24 is 90% or greater, the automatic high-to-low switching control is performed when the engine rotational speed falls to 70% or less. When the engine rotational speed goes up to 90% or greater, automatic low-to-high switching control is performed when the actuation position of a pedal 24 is operated to be 80% or greater.

That is, a large load condition is naturally assumed when the engine drop amount is large when the speed change pedal 24 is operated by a greater amount. But also if a certain amount of engine drop occurs when the amount of the step-in operation of the speed change pedal 24 is small, a large load condition is assumed where a greater drop in engine rotation is expected with a large step-in operation of the pedal 24. Therefore, even if an engine drop amount is small, the high-to-low switching control is performed to secure sufficient driving force. Therefore, even if the operator does not perform shift operation taking into consideration an operation load etc., heavy-load operation which requires a large driving force may be continued without an engine stall. Just when the operator tends to want to accelerate further as the load falls and the engine rotational speed goes up to near predetermined set rotating speed, low-to-high switching control is performed and the vehicle speed is raised. This avoids the inconvenience that low-to-high switching control is performed resulting in an unexpected acceleration despite the operator decreasing the amount of step-in operation on the speed change pedal 24 to slow down with a decrease in the load.

In the high-to-low switching control of the automatic motor swash-plate control means 31G, when the switch actuation is performed, the vehicle speed is low due to traveling load and a shift shock is assumed to be small. Therefore, control for alleviating a shift shock as in the high-to-low switching control in the motor swath-plate control means 31F is not performed. Actuation of the proportional valve 36 for forward travel or the proportional valve 37 for reverse travel is controlled so that switch actuation of the motor swash plate 17A is carried out from a high-speed position to a low-speed position at the predetermined operation speed. After switching the motor swash plate 17A to a low-speed position, that state is maintained for a predetermined time period (for example, for 2 seconds).

Also, in the low-to-high switching control of the automatic motor swash-plate control means 31G, the same control actuation as in the low-to-high switching control in the motor swash-plate control means 31F is performed, and the shift shock generated by low-to-high switch actuation of the motor swash plate 17A is alleviated. After switching the motor swash plate 17A to a high-speed position, this state is maintained for a predetermined time period (for example, for 2 seconds).

It is also possible to configure the automatic motor swash-plate control means 31G such that it performs the automatic high-to-low switching control which switches the motor swash plate 17A from the high-speed position to the low-speed position and turns on the corresponding indicating lamp 61, as the engine rotational speed is detected to have fallen to the low-to-high switch engine speed near a predetermined maximum torque output rotational speed, or to the low-to-high switch engine-speed region, based on the maximum torque output characteristics of the engine 1, and the engine drop amount computed by the operation program of the automatic pump swash plate control means 31D and such that it performs an automatic low-to-high switching control which switches the motor swash plate 17A from the low-speed position to a high-speed position, as the engine rotational speed is detected to have gone up to the low-to-high switch engine speed near predetermined set rotating speed, or to the low-to-high switch engine-speed region, based on an engine drop amount, and turns on the corresponding indicating lamp 62.

The control device 31 has mode change-over means 31H as a control program which switches the control mode performed based on actuation of the mode setting device 64 which has a normally open switch on the display panel 63. When an ON signal is inputted in connection with the pressing of the mode setting device 64, the mode change-over means 31H switches the transmission control mode between a manual-control mode, a semi-automatic-control mode, or a automatic-control mode and turns on an indicating lamps 65-67 corresponding to each control mode. In the manual-control mode, it performs the speed control using control actuation of the pump swash plate control means 31A and switching control using control actuation of the motor swash-plate control means 31F. In the semi-automatic-control mode, it performs the speed control which uses control actuation of the pump swash plate control means 31A, and a load control using control actuation of the automatic pump swash plate control means 31D, and a switching control using control actuation of the motor swash-plate control means 31F, such that priority may be given to load control as opposed to the speed control. In the automatic-control mode, the mode change-over means 31H performs a speed control which uses control actuation of the pump swash plate control means 31A, and a load control using control actuation of the automatic pump swash plate control means 31D, and the automatic switching control using control actuation of the automatic motor swash-plate control means 31G, such that priority is given to load control as opposed to speed control, and such that load control and automatic switching control are coordinated appropriately.

That is, when manual-control mode is selected, the pump swash plate 16A is operated based on the actuation position of the speed change pedal 24 etc., so as to arrive at the target actuation position corresponding to the actuation position of the speed change pedal 24 with target operation speed. And the motor swash plate 17A will be switched between the high and low positions based on actuation of the switching lever 59.

The pump swash plate 16A is operated based on the actuation position of the speed change pedal 24 etc., so as to arrive at the target actuation position corresponding to the actuation position of the speed change pedal 24 with target operation speed. And when a drop in engine speed occurs, based on an engine drop amount etc., it is operated so as to arrive at the limit operation position corresponding to an engine drop amount at the target operation speed, and the motor swash plate 17A is switched between the high and low positions based on actuation of the switching lever 59.

When automatic-control mode is selected, the pump swash plate 16A is operated so as to arrive at the target actuation position corresponding to the actuation position of the speed change pedal 24 at the target operation speed. When engine speed drops, the pump swash plate 16A is operated so as to arrive at the limit operation position corresponding to an engine drop amount at target operation speed, based on an engine drop amount etc. And the motor swash plate 17A is switched between the high and low positions at a suitable timing based on the actuation position of the speed change pedal 24, or the engine drop amount, etc.

Therefore, if the manual-control mode is selected for example, for traveling and a light load operation, or if the semi-automatic-control mode is selected when climbing a relatively steep hill, and for a medium-load operation, or if the automatic-control mode is selected when climbing a very steep hill, or for a heavy-loading operation, such traveling and operation can be performed without increased burden to the operator.

Incidentally, in the load control in the automatic-control mode, the lower limit engine speed of an engine 1 is set lower than the load control in the semi-automatic-control mode so that control sensibility is set low which tends to cause drops in engine speeds. Therefore, the automatic switching control which switches the motor swash plate 17A to a low-speed position can be easily performed.

Moreover, when switch actuation to the low-speed position of the motor swash plate 17A based on actuation of the switching lever 59 is performed in the automatic-control mode, since it is impossible to perform switch actuation to the low-speed position of the motor swash plate 17A by automatic switching control, control mode switches from automatic-control mode to semi-automatic-control mode automatically.

As shown in FIG. 6, the console panel 63 has the liquid-crystal-display device 69 where the display may be changed among a vehicle speed displaying mode, or a remaining fuel displaying mode, etc. based on actuation of the display change-over switch 68. This liquid-crystal-display device 69 displays the target actuation position 69A or the limit operation position 69B, and the current position 69C of the pump swash plate 16A which changes at every moment, when the pump swash plate position display mode is selected by actuation of the display change-over switch 68. That is, by selecting pump swash plate position display mode, the motion of the pump swash plate 16A can be checked easily.

Incidentally, FIG. 6(A) shows the situation where the target actuation position 69A for accelerating for the pump swash plate 16A is set. FIG. 6(B) shows the situation where the pump swash plate 16A is operated toward the target actuation position 69A for accelerating. FIG. 6(C) shows the situation where the target actuation position 69A or the limit operation position 69B for a slowdown of the pump swash plate 16A is set.

When an implement, such as a front loader A, is vertically movably attached with the height sensor 70 having a potentiometer which detects the height position of the implement, the data change means 31C changes the map data, which correlates the actuation position of the speed change pedal 24 with the actuation position of the pump swash plate 16A which the pump swash plate control means 31A uses, to the map data for implement lifting stored in the pump swash plate control means 31A based on detected information from the height sensor 70, as the implement is raised to the height position higher than predetermined height (for example, height position exceeding a car height).

As compared with the map data ordinarily used, the map data for implement lifting sets the actuation position of the pump swash plate 16A for a given actuation position of the speed change pedal 24 to a lower speed side. (See FIG. 7). Because the pump swash plate control means 31A uses this map data, the vehicle speed will be restricted to the low speed side and a high speed travel will be prevented when the implement is raised higher than a set height.

As shown in FIGS. 4 and 5, the servo control mechanism 25 has a servo valve 27, a regulator valve 28, and the swash-plate sensor 30, and the oil temperature sensor 43 which are housed by the casing 71 removably bolt-connected by the right side part of the second casing part 4B in a transmission case 4 and is formed as a unit electronically operated mechanism 72. This electronically operated mechanism 72 may be easily changed to a mechanical type by replacing it with a mechanical unit 76 of one block type by incorporating the operating shaft 73 operatively connected to the speed change pedal 24 through the linkage mechanism (not shown) of a mechanism type as shown in FIGS. 12 and 13, and the servo valve 74 which has a spool which controls flow of the hydraulic fluid to the cylinder 26 for pumps in the casing 75 which is bolt-connected to the right side part of the second casing part 4B in a transmission case 4.

Figure 12:
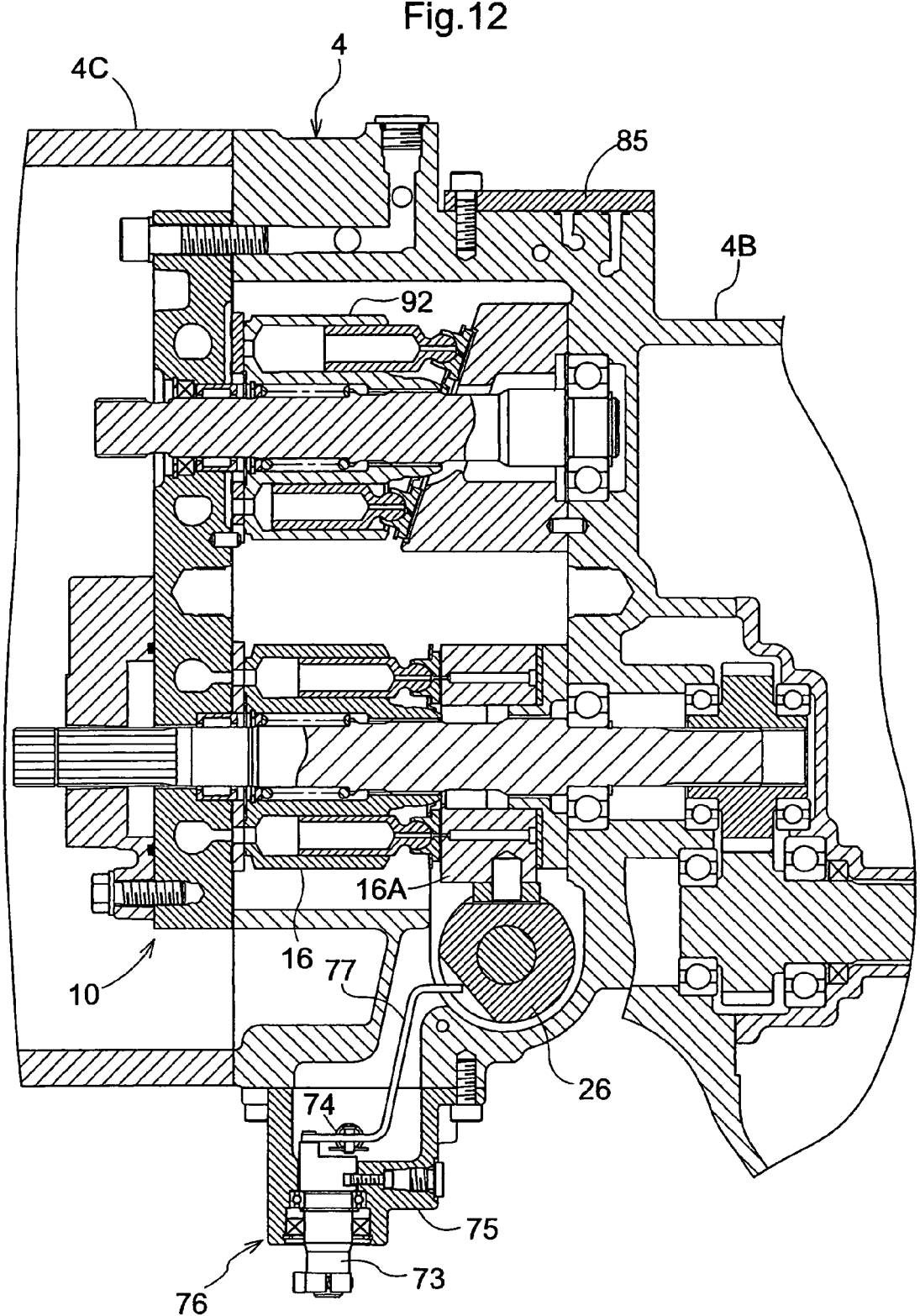
FIG. 12 is a sectional plan view showing a mechanical servo control mechanism.

In addition, the element numbered 77, shown in FIGS. 4 and 12, is a link arm used in the electronics type servo control mechanism 25 as a feedback arm provided between the cylinder 26 for pumps, and the swash-plate sensor 30, and used, in the mechanical servo control mechanism 78, as an actuation/feedback combination arm provided between the cylinder 26 for pumps, and the operating shaft 73 to actuate the servo valve 74.

Figure 13:
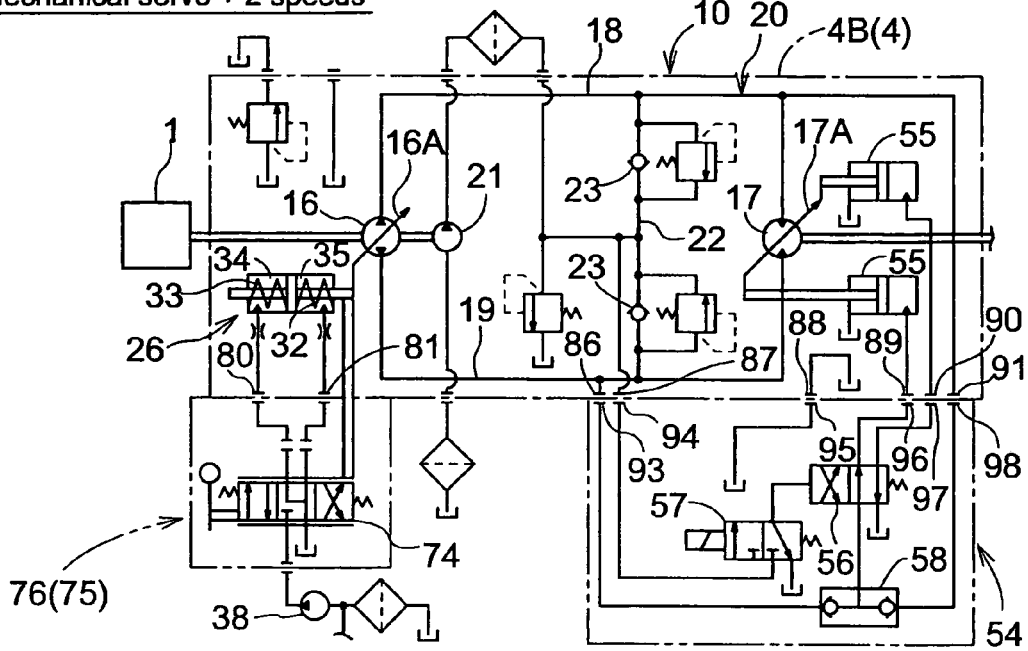
FIG. 13 is a hydraulic circuit diagram showing the mechanical servo control mechanism and the switch over mechanism.

Moreover, the elements numbered 78 and 79 shown in FIGS. 5 and 13 are connecting openings formed in the abutting surface against the second casing part 4B of the casing 71 for connecting to the connecting openings 80 and 81 when the electronics type operated mechanism 72 is bolt-connected to the right side part of the second casing part 4B.

Figure 14:
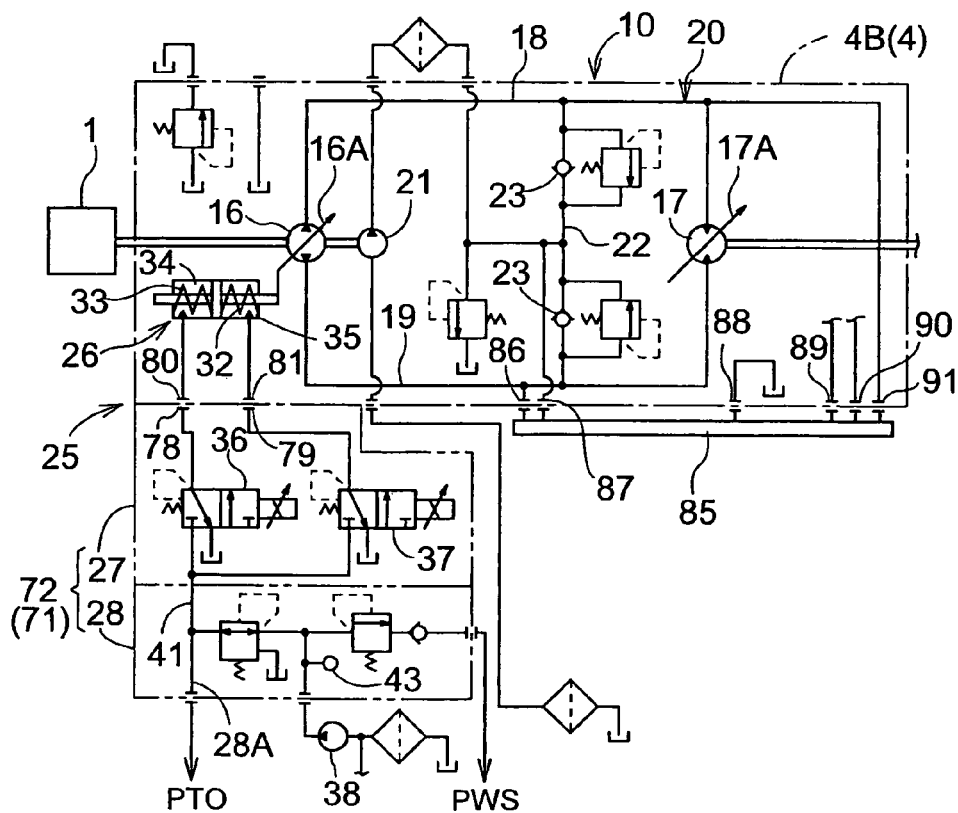
FIG. 14 is a hydraulic circuit diagram showing an arrangement where only an electronic servo control mechanism is used.

As shown in FIGS. 4 and 5, the switching mechanism 54 with the changeover valve 56, the control valve 57, and the high pressure selection valve 58 is formed as a one block unit of the control mechanism 84 by virtue of being housed by the casing 83 removably bolt-connected to the left side part of the second casing part 4B of the transmission case 4. The device can be changed from an adjustable motor specification to a fixed motor specification relatively simply by replacing the operating mechanism 84 with a plate 85 as shown in FIGS. 12 and 14 to cover connecting holes 86-91 formed in the surface with the operating mechanism 84 of the second casing part 4B and by replacing the variable capacity motor 17 in the second casing part 4B with the fixed capacity motor 92, and by removing the cylinder 55 for the motor.

In addition, the elements with reference numbers 93-98 shown in FIG. 5 are communicating ports formed in the bonded surface with the second casing part 4B of casing 83 that are connected to each corresponding communicating ports 86-91 of the second casing part 4B when the switching mechanism 54 is bolt-connected to the left side part of the second casing part 4B.

Figure 15:
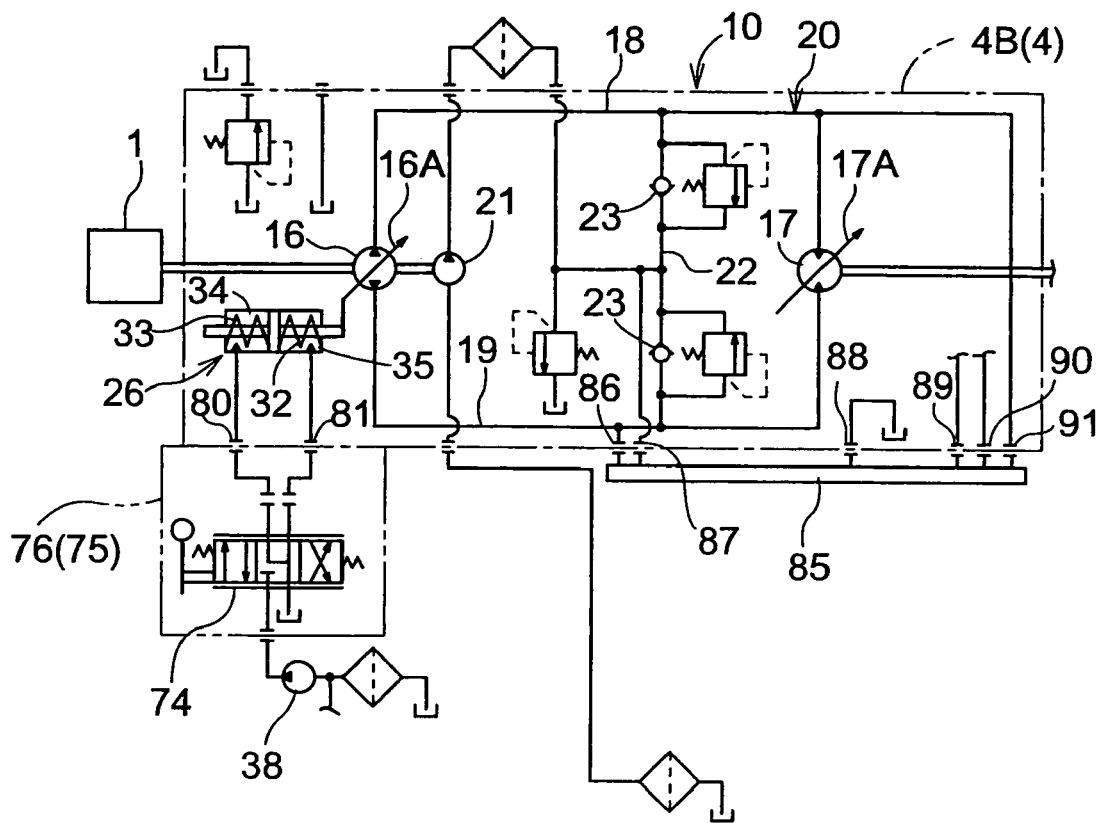
FIG. 15 is a hydraulic circuit diagram showing an arrangement where only a mechanical servo control mechanism is used.

Because of the above-mentioned structure, the arrangement can simply be changed among one having the adjustable motor and the servo control mechanism 25 of the electronic type (see FIG. 5), one with an adjustable motor and the servo control mechanism 78 of the mechanical type (see FIG. 13), one with a fixed motor specification and the electronic servo control mechanism 25 (see FIG. 14), and one with a fixed motor and the servo control mechanism 78 of the mechanical type (see FIG. 15) which allows cost reduction because parts may be shared and facilitates parts management.

As shown in FIG. 6, the end regions of the operation area of the speed change pedal 24 may be set as high-speed regions, and a region between the two ends as a low-speed region, and the motor swash-plate control means 31F may be arranged to control actuation of the control valve 57 based on detected information from the pedal sensor 29 such that when the speed change pedal 24 is operated to a low-speed region, the motor swash plate 17A switches to a low-speed position, and when the speed change pedal 24 is operated to a high-speed region, the motor swash plate 17A is located in a high-speed position to use the speed change pedal 24 also as an operating element for a high-low 2 position change-over of the variable capacity motor 17. The end regions of the operation area of the speed change pedal 24 may be set as a high-speed region, and the motor swash-plate control means 31F may be arranged to control actuation of the control valve 57 based on detected information from the pedal sensor 29 such that when the speed change pedal 24 is operated to a high-speed region, the motor swash plate 17A is switched to a high-speed position to use the speed change pedal 24 also as an operating element for a low-to-high switch of the variable capacity motor 17.

Thus, when the speed change pedal 24 is used also as an operating element for switching the variable capacity motor 17, a detent mechanism (not shown) may be provided for indicating the boundary of the operation area of the speed change pedal 24.

Another embodiment of the present invention is described next with reference to the drawings.

Descriptions are generally not repeated for the parts already described above.

Figure 16:
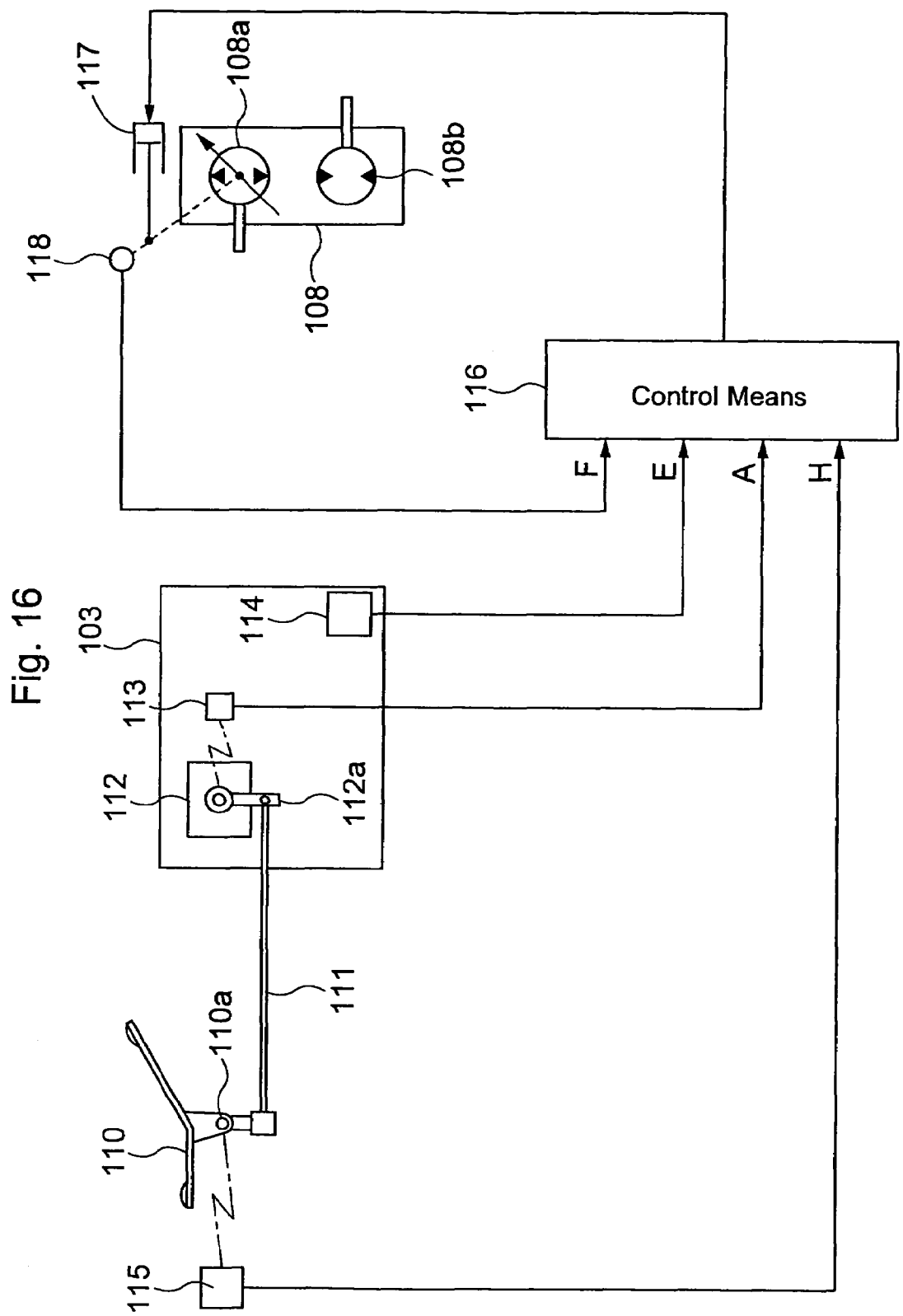
FIG. 16 is a block diagram of travel control device.

As shown in FIG. 16, the speed change pedal 110 provided in the operator's station is operatively connected to the control lever 112a of the accelerator mechanism 112 as a speed adjusting mechanism for said engine 1 via the mechanical interlocking mechanism 111 having the operating cable or an interlocking rod, etc. that can transmit pushing or pulling force.

The set engine rotational speed sensor 113 provided in said accelerator mechanism 112, the actual engine rotational speed sensor 114 provided in said engine 1, and the shift operation sensor 115 (operation position detecting means) operatively connected with said speed change pedal 110 are connected to the control means 116.

The speed change actuator 117 and the stroke sensor 118 (swash plate position detection means or speed change position detecting means) which are provided in said continuously variable speed change device 108 are also connected to the control means 116.

The speed change pedal 110 and the control lever 112a are operatively connected by the interlocking mechanism 111 such that when the speed change pedal 110 is operated from the neutral position to the forward travel region and when it is operated from the neutral position to the reverse travel region, the control lever 112a of the accelerator mechanism 112 is pivoted to the high-speed side from an idling position.

The set engine rotational speed sensor 113 has a potentiometer with its operating element operatively connected to the control lever 112a of the accelerator mechanism 112, and detects the set engine rotational speed based on the actuation location of the control lever 112a which is set as an engine rotational speed set by the accelerator mechanism 112. This detected set engine rotational speed A is sent to the control means 116 as electrical signals.

The actual engine rotational speed sensor 114 has a rotation sensor operatively connected the output shaft (not shown) of the engine 1, and detects the actual engine speed of the engine 1, converts this detected actual engine rotational speed to electrical signals, and outputs it to the control means 116.

The speed change operation sensor 115 consists of the potentiometer with its operating shaft operatively connected to the rotating pivot 110a of the speed change pedal 110, and detects the actuation position of the speed change pedal 110 based on the rotation position of the rotating pivot 111a, converts this detected actuation position H to an electrical signal, and outputs it to the control means 116.

The speed change actuator 117 is operatively connected to the swash-plate operating shaft (not shown) of the hydraulic pump 108a of the continuously variable speed change device 108, and carries out the speed change operation of the continuously variable speed change device 108 by rotating the swash plate of the hydraulic pump 108a.

The stroke sensor 118 is operatively connected to the swash-plate operating shaft of the hydraulic pump 108a, detects the speed change condition of the continuously variable speed change device 108 based on the swash-plate angle, converts this detected speed change condition F to an electrical signal, and outputs it to the control means 116.

That is, the actuation position of a swash plate is understood as a speed position F of the continuously variable speed change device 108. Therefore, when the target speed of the continuously variable speed change device 108 is set, the swash plate is operated toward the actuation position corresponding to the set target speed.

Figure 18:
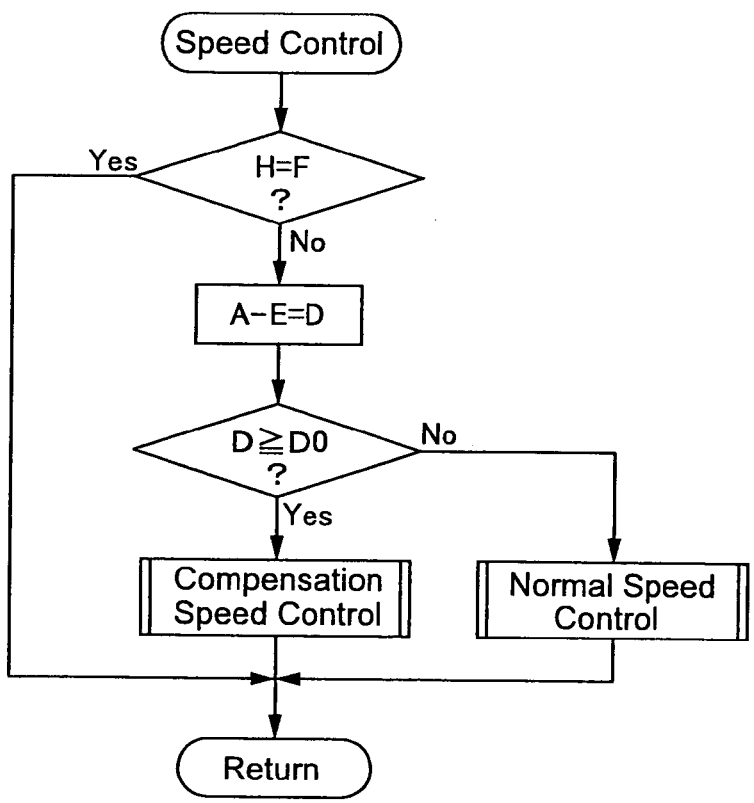
FIG. 18 is a flow chart for a speed control.
Figure 19:
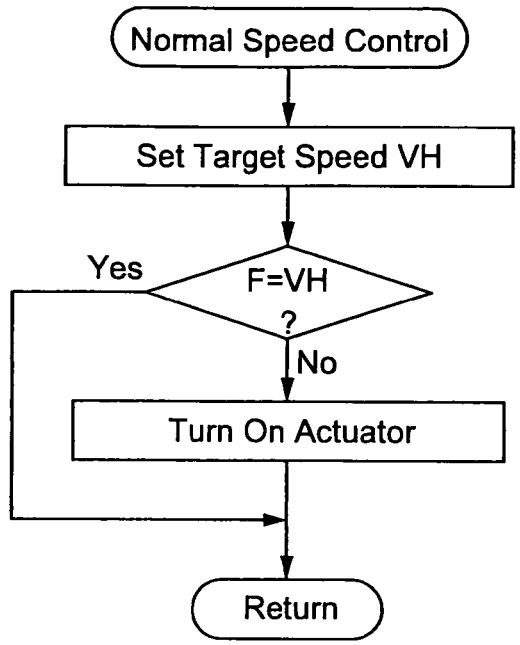
FIG. 19 is a flow chart for a normal speed control.
Figure 20:
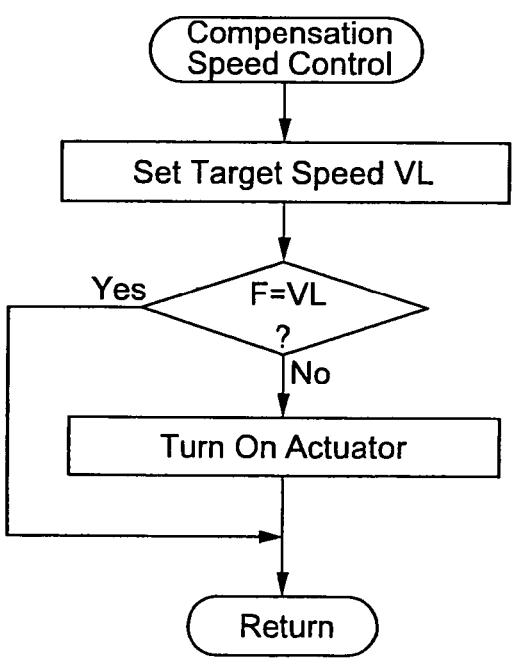
FIG. 20 is a flow chart for a compensating speed control.

The control means 116 has a microcomputer, and is adapted to operate as shown in FIGS. 18, 19, and 20. More specifically, as shown in FIG. 18, the control means 116 determines whether the speed change pedal 110 is operated based on the detected information from the speed change operation sensor 115 and if it determines that the speed change pedal 110 is operated, it calculates the difference between the detected set engine rotational speed A and the detected actual engine rotational speed E based on the detected information from the set engine rotational speed sensor 113 and the actual engine rotational speed sensor 114, and determines, based on this calculation difference D, whether there is any difference between the detected set engine rotational speed A and the detected actual engine rotational speed E.

It determines that there is no difference between the detected set engine rotational speed A and the detected actual engine rotation E if the calculation difference D is smaller than the set difference DO (200 rpm). And if the calculation difference D is greater than the set difference DO (200 rpm), it determines that there is a difference in the detected set engine rotational speed A and the detected actual engine rotational speed E.

If it determines that there is no difference between the detected set engine rotational speed A and the detected actual engine rotational speed E, a speed change control which carries out the speed change operation of the continuously variable speed change device 108 by the normal speed change control will be performed.

If it determines that there is a difference between the detected set engine rotational speed A and the detected actual engine rotational speed E, a different speed change control which carries out the compensating speed change control of the speed change operation of the continuously variable speed change device 108 will be performed.

If the detected speed change operation position F from the stroke sensor 118 is a speed change operation condition corresponding to the detected actuation position H from the speed change operation sensor 115, the speed change operation of the continuously variable speed change device 108 is suspended.

As shown in FIG. 19, when performing the normal speed change control of the speed change operation of the continuously variable speed change device 108, the control means 116 sets the position of the speed of the speed change actuator 117 to the position corresponding to the normal control target speed VH based on the detected information by the speed change operation sensor 115, and operates the continuously variable speed change device 108 to a position corresponding to the normal control target speed VH by operating the speed change actuator 117 so as to make the detected speed change position F by the stroke sensor 118 come into agreement with the position corresponding to the normal control target speed VH.

As shown in FIG. 20, when performing the compensating speed change control of the speed change operation of the continuously variable speed change device 108, the control means 116 sets the operated position of the speed change actuator 117 to a position corresponding to the compensating control target speed VL based on the detected information by the speed change operation sensor 115, and operates the continuously variable speed change device 108 to the position corresponding to the compensating control target speed VL by operating the speed change actuator 117 so as to make the detected speed change position F from the stroke sensor 118 come into agreement with the position corresponding to the compensating control target speed VL.

Figure 17:
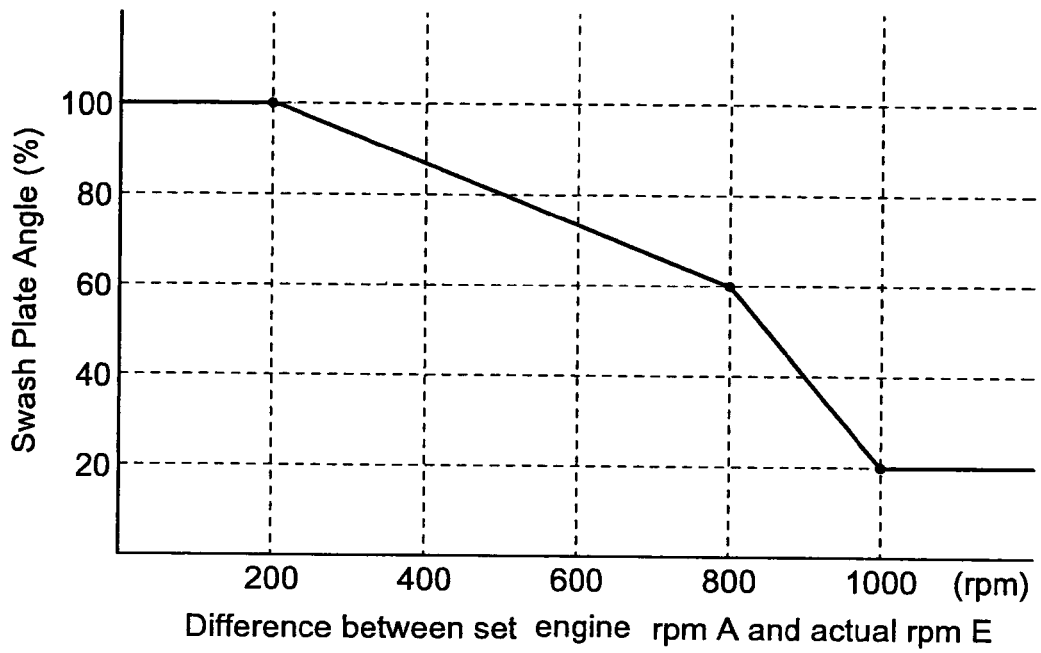
FIG. 17 is a graph showing the normal control target speed and the compensating control target speed.

The control means 116 sets the normal control target speed VH and the compensating control target speed VL based on the map shown in FIG. 17. More specifically, the normal control target speed VH and the compensating control target speed VL are set such that, the swash plate position is 100 when the difference D between the detected set engine rotational speed A and the detected actual engine rotational speed E is less than 200 rpm, and the swash plate angular position is 60 when the difference D is 800 rpm, whereas when the difference D is greater than 1000 rpm, the swash plate angular position is 20.

Therefore, the compensating control target speed VL is set lower than the normal control target speed VH.

That is, when the vehicle is running, by stepping in the speed change pedal 110 into a forward travel region or a reverse travel region, the interlocking mechanism 111 pivots the control lever 112a of the accelerator mechanism 112 to the high-speed side. When the accelerator mechanism 112 is then operated to the high-speed side, the set engine rotational speed is changed into the high-speed side. And with this, based on the detected information from the speed change operation sensor 115, the control means 116 operates the speed change actuator 117 to operate the continuously variable speed change device 108 to the high-speed side.

This allows the engine 1 and the continuously variable speed change device 108 to operate in cooperation so as to increase the engine rotation speed and to operate the device 108 to an accelerating side corresponding to the engine rotation speed, which results in acceleration of the vehicle in either a forward direction or in reverse direction.

At this time, if engine speed changes in good response to the actuation of the accelerator mechanism 112 and if the engine rotational speed goes up to the speed equal to or almost equal to the set engine rotational speed set by the accelerator mechanism 112, the control means 116 determines that there is no or almost no difference D between the detected set engine rotational speed A and the detected actual engine rotational speed E based on the detected information by the set engine rotational speed sensor 113 and the actual engine rotational speed sensor 114. And the control means 116 sets the normal control target speed VH based on this determination result and the detected information by the speed change operation sensor 115 to carry out the speed change operation of the continuously variable speed change device 108 such that the continuously variable speed change device 108 is operated to the position corresponding to the normal control target speed VH.

On the other hand, if engine speed does not change in good response to the actuation of the accelerator mechanism 112 and the engine rotational speed does not go up to the speed equal to or almost equal to the set engine rotational speed set by the accelerator mechanism 112, the control means 116 determines that there is a difference D between the detected set engine rotational speed A and the detected actual engine rotational speed E based on the detected information by the set engine rotational speed sensor 113 and the actual engine rotational speed sensor 114. And it sets the compensating control target speed VL which is lower than the normal control target speed VH based on this determination result and the detected information by the speed change operation sensor 115 to carry out the speed change operation of the continuously variable speed change device 108 such that the continuously variable speed change device 108 is operated to the position corresponding to the compensating control target speed VL.

Thus, when the engine rotational speed does not go up to or near the speed engine rotational speed set by the accelerator mechanism 112 despite the actuation of the accelerator mechanism 112 to the high speed side corresponding to the step-in operation of the speed change pedal 110, the continuously variable speed change device 108 is operated only to a relatively low-speed position compared with the case where the engine rotational speed goes up to the speed set by the accelerator mechanism 112.

Thus load to the engine 1 becomes less, making it more difficult to stall. At the same time, it allows the engine speed to go up to the value set by the accelerator mechanism 112. A speed change lever may be used instead of the speed change pedal 110 in the invention. Accordingly, the speed change pedal 110 and a speed change lever are called speed change control.

A further embodiment is described next.

FIG. 21 is a block diagram for the traveling operating device of the tractor.

As shown in this drawing, the traveling operating device has the hydraulic-pressure speed change cylinder 226 which operates said continuously variable speed change device 210 and an electric actuator 241 (accelerator actuator 241) which operates the accelerator device 240 of said engine 1. It also has the control means 221 in communication with the servo control mechanism 220 which controls said speed change cylinder 226, and in communication with said accelerator actuator 241.

The traveling operating device also has the speed change pedal 224 and accelerator lever 225 which are provided in the operator's station, and the rotation-type potentiometer 227 (pedal sensor 227) which functions as a sensor that detects the actuation position of said speed change pedal 224, and outputs this detected information to said control means 221, and the rotation-type potentiometer 228 (accelerator lever sensor 228), which functions as a sensor that detects actuation positions of said accelerator lever 225 and outputs this detected information to said control means 221.

Further, the traveling operating device has the interlocking mechanism 250 which operatively connects or disconnects said speed change pedal 224 with the final controlling element 240a of said accelerator device 240, an operating mechanism 260 which switches the interlocking mechanism 250 between an ON (engaging) position and an OFF (disengaging) position by the lever 261 provided in the operator's station, the detection switch 229 (ON-OFF sensor 229), which functions as a sensor that detects actuation positions of said lever 261 and outputs this detected information to said control means 221.

As shown in FIG. 21, said servo control mechanism 220 has the forward travel proportional control valve 231 and the reverse travel proportional control valve 232. This forward travel proportional control valve 231 and the reverse travel proportional control valve 232 are controlled by the command from the control means 221. The speed change cylinder 226 is operated such that the continuously variable speed change device 210 is operated to the speed change condition (position) corresponding to the actuation position of the speed change pedal 224.

Said transmission case 4B houses this servo control mechanism 220.

Said control means 221 has a microcomputer and operates the speed change cylinder 226 through the servo control mechanism 220 so that the continuously variable speed change device 210 is operated to the speed change condition corresponding to the actuation position of the speed change pedal 224 based on the detected information by said pedal sensor 227, and on the detected information by the swashplate sensor 234 which detects the speed change condition (i.e. position) of the continuously variable speed change device 210 based on the angle of said swash plate.

When the control means 221 determines, based on the detected information from said ON-OFF sensor 229, whether said interlocking mechanism 250 is either in its ON position or OFF position. If it determines that the interlocking mechanism 250 is in the OFF position, it operates the accelerator actuator 241 such that the accelerator device 240 is in the operating condition which makes the engine 1 produce the rotating speed corresponding to the actuation position of the accelerator lever 225 based on the detected information by the accelerator lever sensor 228 and on the detected information from the accelerator sensor 235.

On the other hand, if the control means 221 determines that the interlocking mechanism 250 is in the ON (engaging) position, it stops the operation of the accelerator actuator 241 based on the accelerator lever sensor 228 and the accelerator sensor 235 and switches the accelerator actuator 241 to a state where it can be operated by an external force so that the accelerator device 240 can be operated by the speed change pedal 224.

When traveling, as the front side controlling portion 224a (FIGS. 22, 24) of the speed change pedal 224 is operated to the vehicle front side from the neutral position, the continuously variable speed change device 210 is operated to the forward travel side by a movement of the speed change cylinder 226 by the control means 221 to the forward travel side, and the vehicle moves forward.

As the rear side control portion 224b (FIGS. 22 and 24) of the speed change pedal 224 is operated rearwardly from the neutral state by a step-in operation, the control means 221 operates the speed change cylinder 226 to the reverse travel side to operate the continuously variable speed change device 210 to the reverse travel side, resulting in the tractor traveling in reverse.

In either the forward travel or in reverse, the greater the amount of the operating stroke of the speed change pedal 224, the greater extent to which the control means 221 operates the speed change cylinder 226 to the high-speed side, and thus, the more the continuously variable speed change device 210 is operated to the high-speed side, resulting in increased travel speed.

Thus, when traveling on the street, for example, the ON-OFF lever 261 is switched to the ON position. Then, by the action of the operating mechanism 260, the interlocking mechanism 250 will be in the ON position to operatively connect the speed change pedal 224 with the accelerator device 240. Thus, when the step in operation of the speed change pedal 224 is carried out, the accelerator device 240 is then operated to the accelerating side, and the engine speed of an engine 1 rises.

The greater the amount by which the continuously variable speed change device 210 is operated to the high speed side by an increased treading-in stroke of the speed change pedal 224, the greater is the amount with which the accelerator device 240 is operated to the high-speed side, resulting in a further increase in the engine rotational speed. Thus, the engine rotational speed goes up when traveling at high speed, making it difficult for an engine stall to occur.

On the other hand, by releasing the speed change pedal 224 so as to let the pedal 224 move to the low speed side by the operating force of the return mechanism of the positioning mechanism 270, the accelerator device 240 moves to the slowdown side correspondingly. Thereby, when traveling at a low speed, the engine speed of the engine 1 is kept low and fuel consumption will decrease.

On the other hand, when traveling, the interlocking ON-OFF lever 261 is switched to the OFF position. Then, by the action of the operating mechanism 260, the interlocking mechanism 250 is operated to the OFF position, disengaging the speed change pedal 224 from the accelerator device 240. Even if the speed change pedal 224 is operated in the accelerating direction or is allowed to return to the low speed side, the accelerator device 240 maintains the speed state set by the accelerator lever 225. For this reason, even if the travel speed changes, the engine speed does not change and the connected implement maintains the predetermined rotating speed.

Figure 22:
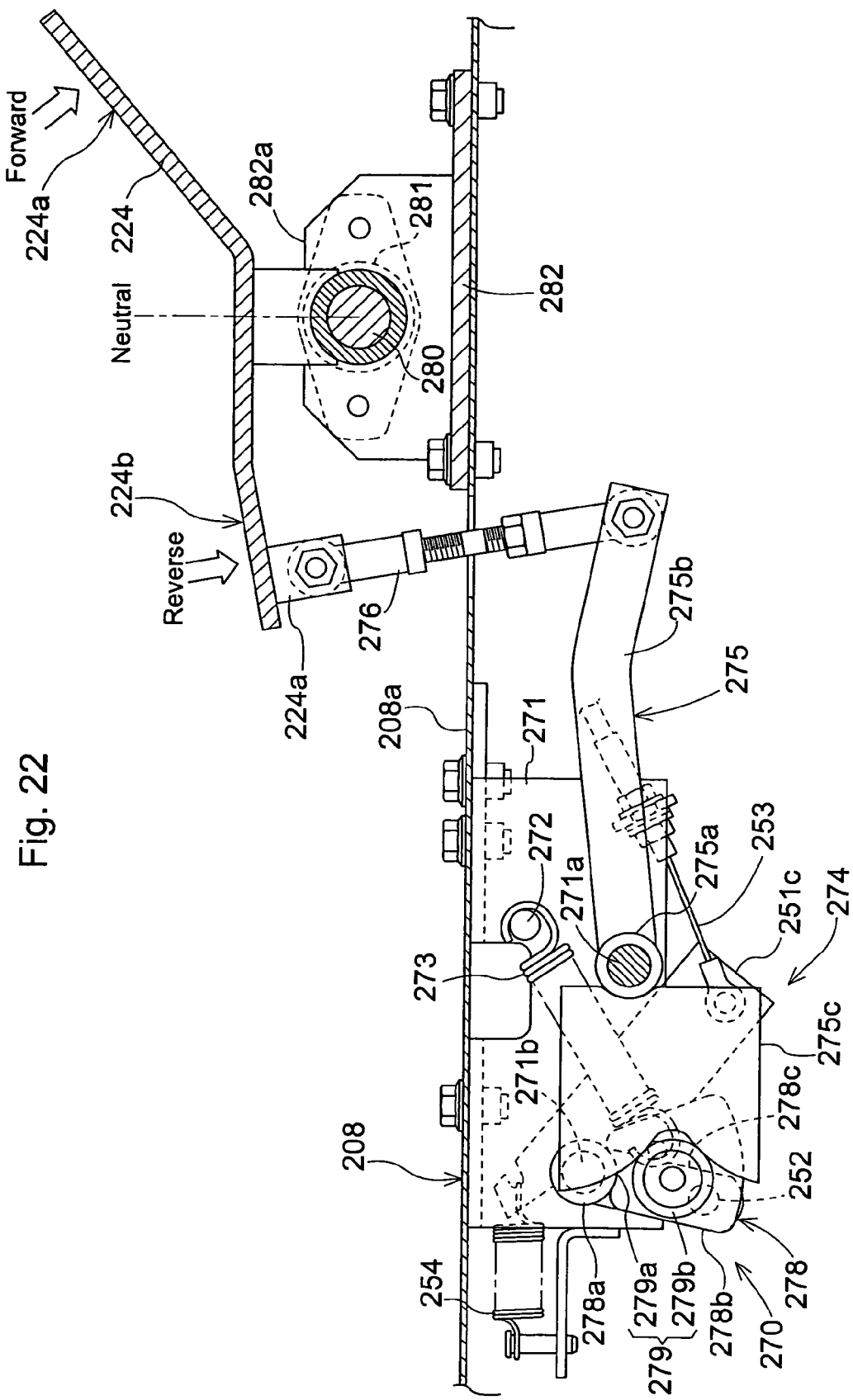
FIG. 22 is a side view of positioning mechanism.
Figure 25:
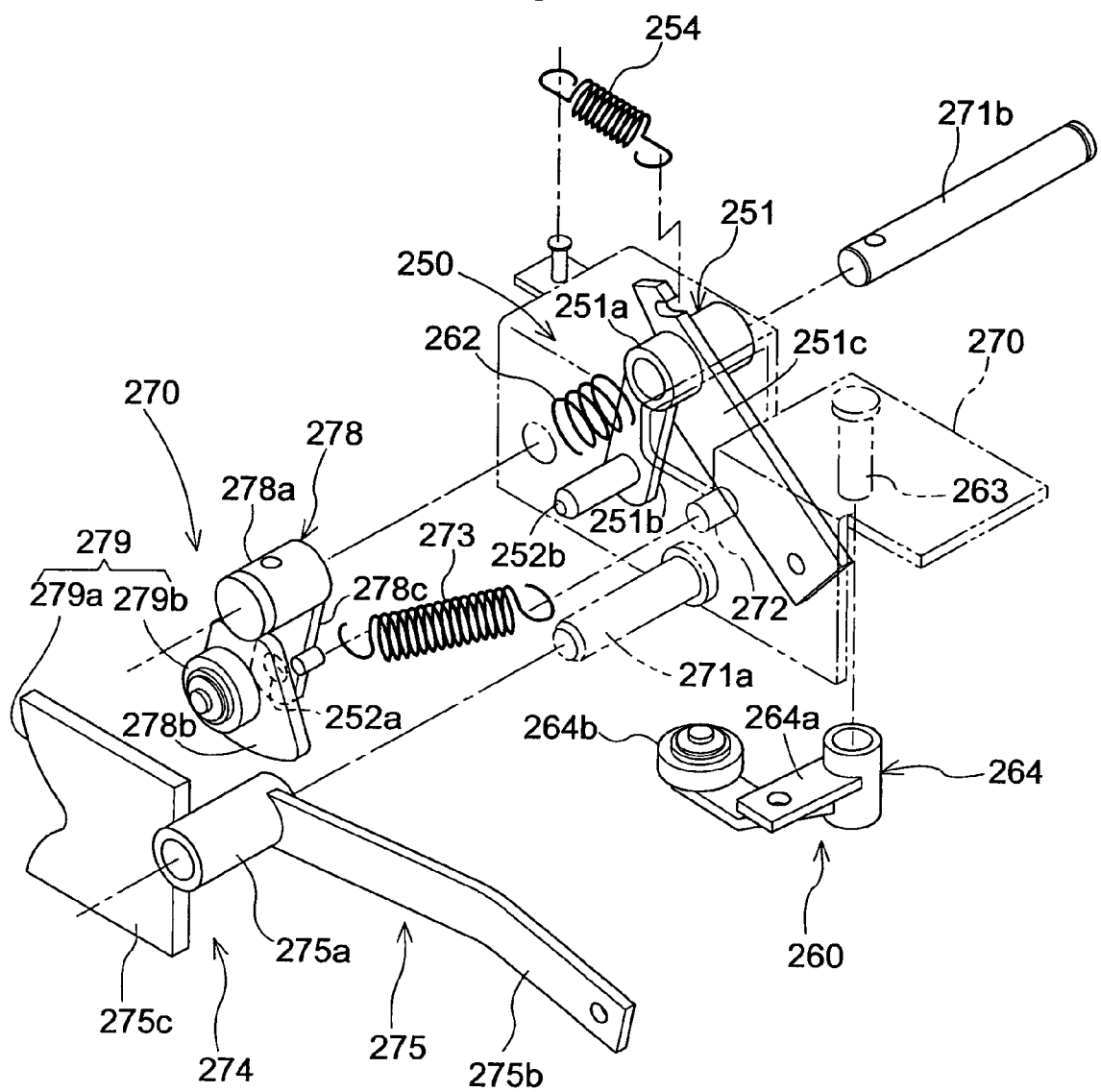
FIG. 25 is a perspective view of the positioning mechanism and the accelerator interlocking mechanism.

FIG. 22 is a side view of said positioning mechanism 270 of the speed change pedal 224. FIG. 25 is a perspective view of the positioning mechanism 270. As shown in these drawings, the positioning mechanism 270 has an urging mechanism 274 with the coil spring 273 whose one end is supported by the spring holder 272 of the base 271 that is fixed to the underside side of the floor plate of the operator's station and the rotary damper 281 operatively connected to one end side of the rotating pivot 280 of the speed change pedal 224.

The urging mechanism 274 has, in addition to said spring 273, the rotation member 275 supported freely rotatably by the connection cylinder portion 275a to the pivot 271a of said shaped base 271, the interlocking rod 276 which connects an end of the arm part 275b of this rotation member 275 to the connecting piece 224a located in the rear end part of the speed change pedal 224, a positioning pivoting member 278 supported freely rotatably by the connection cylinder portion 278a on the pivot 271b of said shaped base 271, and a cam mechanism 279 provided between the pivoting link part 278b of the other side of said positioning pivoting member 278 and the cam plate parts 275c of said rotation member 275. Said spring 273 is connected with one 278c of a pair of pivoting link parts 278b and 278c of said positioning pivoting member 278.

As shown in FIGS. 22 and 25, said cam mechanism 279 has a V-shaped slant cam surface 279a provided in said cam plate part 275c of said rotation member 275, and a rotating-type cam follower 279b formed with a roller supported freely rotatably on said pivoting link part 278b of said positioning pivoting member 278. The spring 273 urges said cam follower 279b against said slant cam surface 279a by urging said pivoting link part 278c.

Figure 24:
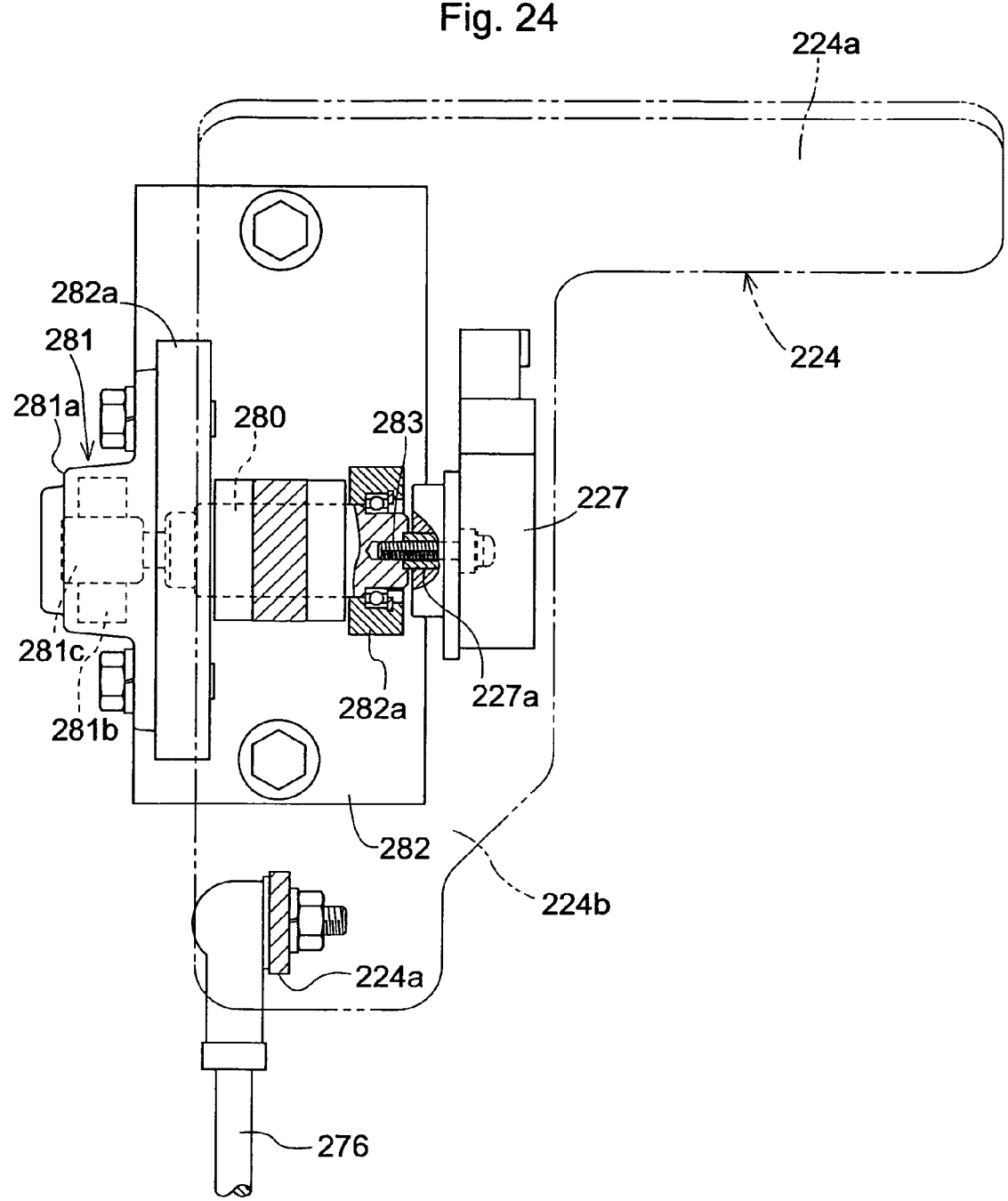
FIG. 24 is a plan view of the rotary dumper and where the potentiometer is provided.

As shown in FIG. 24, the rotary damper 281 has a body case 281a, a rotor 281b freely rotatably accommodated inside this body case 281a, damper oil in said body case 281a, and a rotor operation member 281c operatively connected to the rotor 281b.

The body case 281a is fixed to an outer surface of one of the pair of said vertical piece sections 282a of the support member 282 which supports the speed change pedal 224 freely rotatably by supporting said rotating pivot 280 of said speed change pedal 224 by a pair of vertical piece sections 282a.

The rotor operation body 281c is connected to the rotating pivot 280 so as to be rotatable in unison and is concentrically located with said rotating shaft 280.

That is, regardless of whether the speed change pedal 224 is operated to the forward travel side or to the reverse travel side from the neutral position, the rotation member 275 rotates about the axis of a pivot 271 in response to pivoting of the speed change pedal 224. The positioning pivoting member 278 rotates the rotation member 275 to the initial position by the action of the cam mechanism 279. Thereby, the positioning mechanism 270 positions the speed change pedal 224 at the neutral position by the elastic restoring force of the spring 273, and speed change pedal 224 is returned to the neutral position regardless of whether the speed change pedal 224 is returned to the forward travel side or to the reverse travel side.

Furthermore, the positioning mechanism 270 provides a rotation drag to the speed change pedal 224 with a rotary damper 281 so that the speed change pedal 224 is not returned to the neutral position too quickly by the spring 273.

Figure 23:
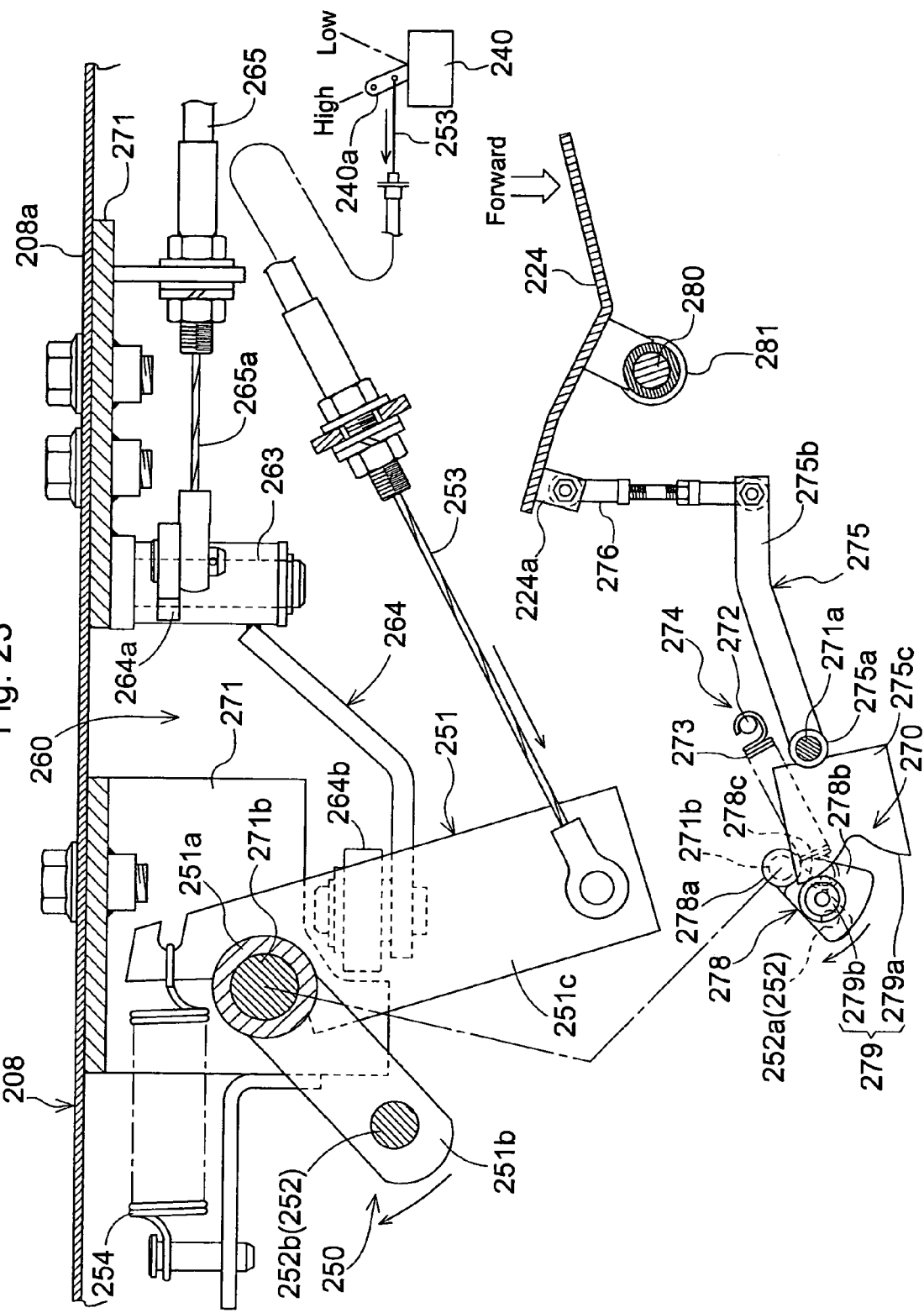
FIG. 23 is a side view of the interlocking mechanism.
Figure 27:
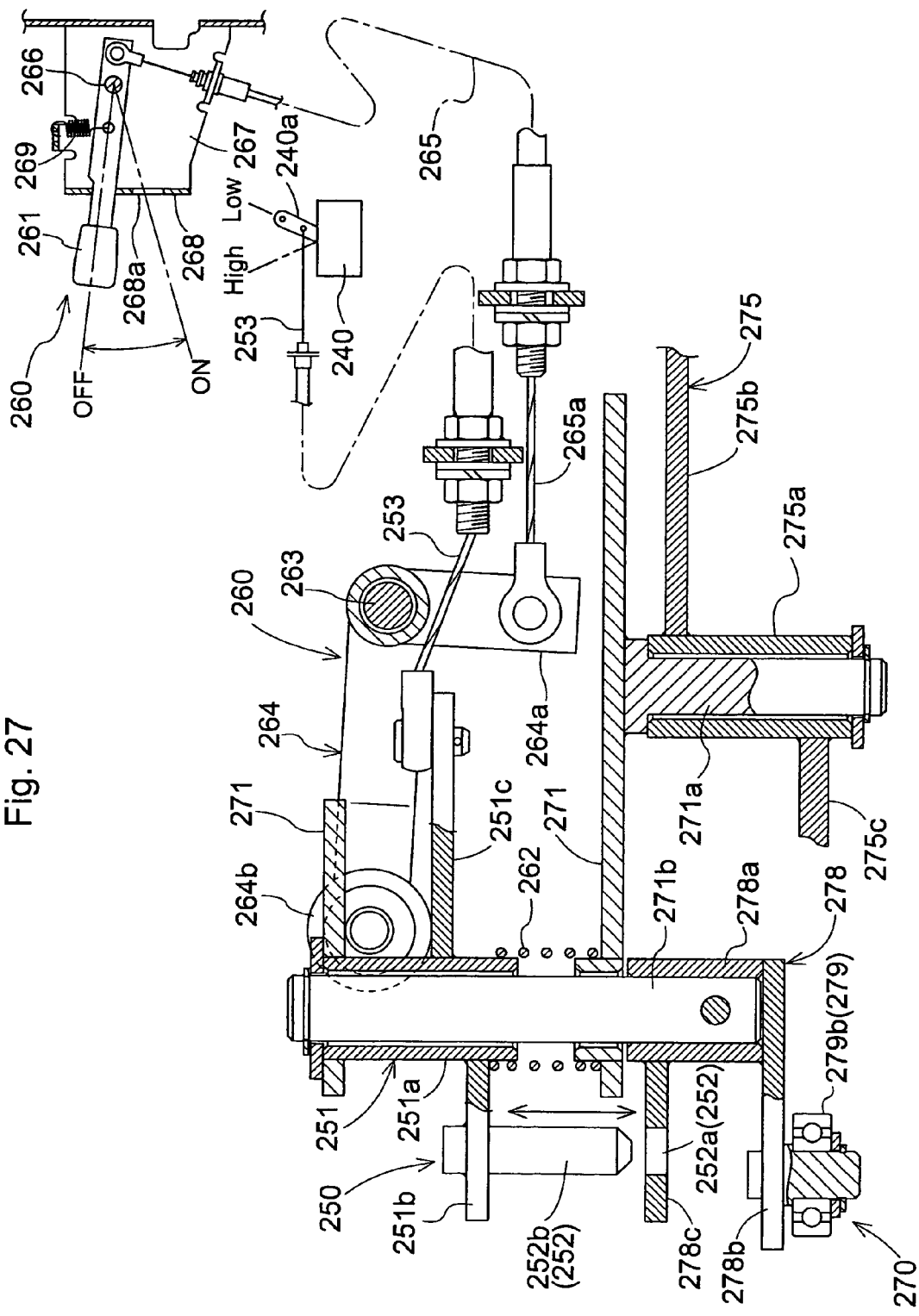
FIG. 27 is a plan view showing the engaging mechanism in its disengaged state.

As shown in FIGS. 23, 25, and 27, said interlocking mechanism 250 which operatively connects the speed change pedal 224 and the accelerator device 240 has the positioning mechanism 270, an accelerator interlocking member 251 supported freely rotatably by the connection cylinder portion 251a about said pivot 271b which supports said positioning pivoting member 278, an engaging mechanism 252 provided between one 251b of the pair of the pivoting link parts 251b, 251c of the accelerator interlocking member 251 and one pivoting link part 278c of said positioning pivoting member 278, an operating cable 253 which operatively connects the pivoting link part 251c of said another side of said accelerator interlocking member 251 with the control portion 240a of the accelerator device 240, and a return spring 254 connected with said one pivoting link part 251c of the accelerator interlocking member 251.

The accelerator interlocking member 251 is slidably supported by said pivot 271b so as to be able to move toward and away from the positioning pivoting member 278.

Said engaging mechanism 252 has a pin hole 252a provided in the pivoting link part 278c of the positioning pivoting member 278, and a interlocking pin 252b fixed to the pivoting link part 251b of the accelerator interlocking member 251 so that it can be inserted into the pin hole 252a.

Figure 28:
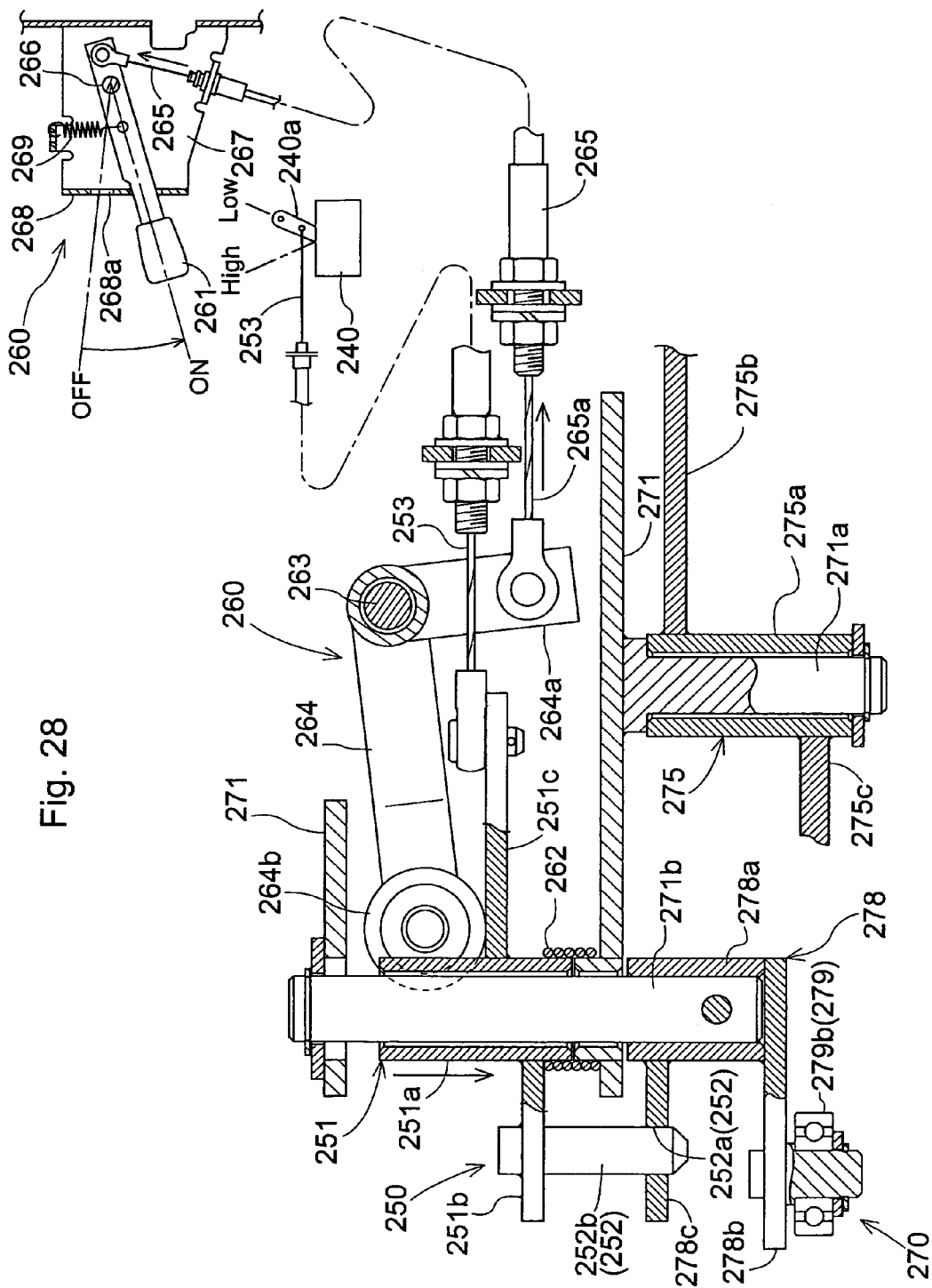
FIG. 28 is a plan view showing the engaging mechanism in its engaged state.

FIG. 27 is a plan view of said engaging mechanism 252 in its disengaged state, and FIG. 28 is a plan view of said engaging mechanism 252 in its engaged state.

The interlocking pin 252b is inserted into the pin hole 252a as the accelerator interlocking member 251 is slid along the pivot shaft 271b toward the positioning pivoting member 278 as shown in these figures. The engaging mechanism 252 will be in the engaging state where the positioning pivoting member 278 and the accelerator interlocking member 251 are engaged and may be pivoted together.

On the other hand, as the accelerator interlocking member 251 is slid along the pivot shaft 271b away from the positioning pivoting member 278, the interlocking pin 252b moves out from the pin hole 252a. Then, the engaging mechanism 252 will be in the disengaged condition where the positioning pivoting member 278 and the accelerator interlocking member 251 are disengaged from each other and can pivot independently.

As shown in FIGS. 23, 25, and 27, said operating mechanism 260 (which carries out a switchover control of said interlocking mechanism 250 between an engaged position and a disengaged position) has, in addition to the interlocking ON-OFF lever 261, a spring 262 located on the pivot shaft 271b between said positioning pivoting member 278 and said accelerator interlocking member 251, the operation arm 264 supported freely rotatably by said base member 271 through the pivot shaft 263, and an operating cable 265 with the inner cable 265a whose one end is connected to the cable connection portion 264a of this operation arm 264.

The other end of the inner cable 265a of said operating cable 265 is connected to said interlocking ON-OFF lever 261. The spring 262 urges said accelerator interlocking member 251 away from the positioning pivoting member 278 so as to urge the interlocking pin 252b of said engaging mechanism 252 out from the pin hole 252a.

Figure 26:
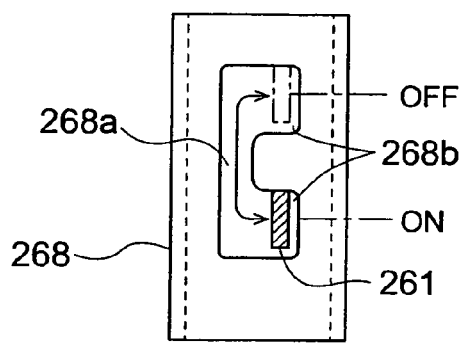
FIG. 26 is a front view of the lever guide.

The interlocking ON-OFF lever 261 is supported by the support member 267 through the lever pivot shaft 266, and can be pivoted about the axis of the lever pivot shaft 266 along the guide groove 268a (see FIG. 26) of the lever guide 268 of the support member 267. The rotatable roller 264b is provided to the free end of said operation arm 264.

The operation arm 264 causes said roller 264b to contact the pivoting link part 251c of said accelerator interlocking member 251 by its pivoting operation about the axis of the pivot shaft 263 to push the accelerator interlocking member 251 toward the positioning pivoting member 278 against the urging force of the said spring 262, or to cause the roller 264b to stop pushing the pivoting link part 251c to allow the accelerator interlocking member 251 to be moved away from the positioning pivoting member 278 by said spring 262.

Therefore, as the interlocking ON-OFF lever 261 is pivoted along the guide groove 268a, the operating mechanism 260 pivots the operation arm 264 through the pulling force of the operating cable 265 to cause the accelerator interlocking member 251 to be moved toward the positioning pivoting member 278 through the roller 264b to switch the engaging mechanism 252 to the engaged state and the interlocking mechanism 250 to the engaged position.

The operating mechanism 260 also causes the accelerator interlocking member 251 to move away from the positioning pivoting member 278 under the urging force of the spring 262 to switch the engaging mechanism 252 to the disengaged state and the interlocking mechanism 250 to the disengaged position.

That is, when the speed change pedal 224 and the accelerator device 240 are operatively connected, the interlocking ON-OFF lever 261 is pivoted along the guide groove 268a to switch to the ON position located at the end of the guide groove 268a. Then, the operating mechanism 260 operates the accelerator interlocking member 251 toward the positioning pivoting member 278 by the operation arm 264. And the engaging mechanism 252 switches to an engagement state. Thereby, the interlocking mechanism 250 is switched to the engaged position, and the operating physical force of the speed change pedal 224 is transmitted to the control portion 240a of the accelerator device 240 through the interlocking rod 276, the rotation member 275, the positioning pivoting member 278, the interlocking pin 252b, the accelerator interlocking member 251, and the operating cable 253.

Although the pivoting direction of the speed change pedal 224 differ depending on whether the speed change pedal's 224 is operated to the forward travel side or to the reverse travel side, and although the direction of rotation of the rotation member 275 differs, the positioning pivoting member 278 pivots from the initial position to the same pivoting direction by the configuration of the slant cam surface 279a, and the operating cable 253 is pulled regardless of the direction of operation.

Therefore, the speed change pedal 224 and the accelerator device 240 are operatively connected such that the control portion 240a of the accelerator device 240 is operated to the high-speed in response to the operation of the side speed change pedal 224 regardless of the step-in direction of the speed change pedal 224.

Moreover, by moving the interlocking ON-OFF lever 261 into the notch section 268b (FIG. 26) of a lever guide 268, the interlocking ON-OFF lever 261 is maintained in the notch section 268b by the spring 269, and is held in the engaged ON position to maintain the interlocking mechanism 250 in the engaged position.

To disengage the speed change pedal 224 from the accelerator device 240, the interlocking ON-OFF lever 261 is switched to the OFF position located in the other end of the guide groove 268a. Then, the operating mechanism 260 moves the accelerator interlocking member 251 away from the positioning pivoting member 278 under the urging force of the spring 262 to switch the engaging mechanism 252 to the disengaged condition. Thereby, the interlocking mechanism 250 is in an OFF position, and the operating physical force of the speed change pedal 224 is not transmitted to the control portion 240a of the accelerator device 240.

As shown in FIG. 24, said pedal sensor 227 is arranged at the opposite side from the side in which said rotary damper 281 is located with respect to said rotating shaft 280 of the speed change pedal 224. The rotary operating shaft 27a of the pedal sensor 227 is connected to said rotating shaft 280 by the connection screw 283 on the side opposite to side where the rotary damper 281 is connected to the rotating shaft 280.

Figure 29:
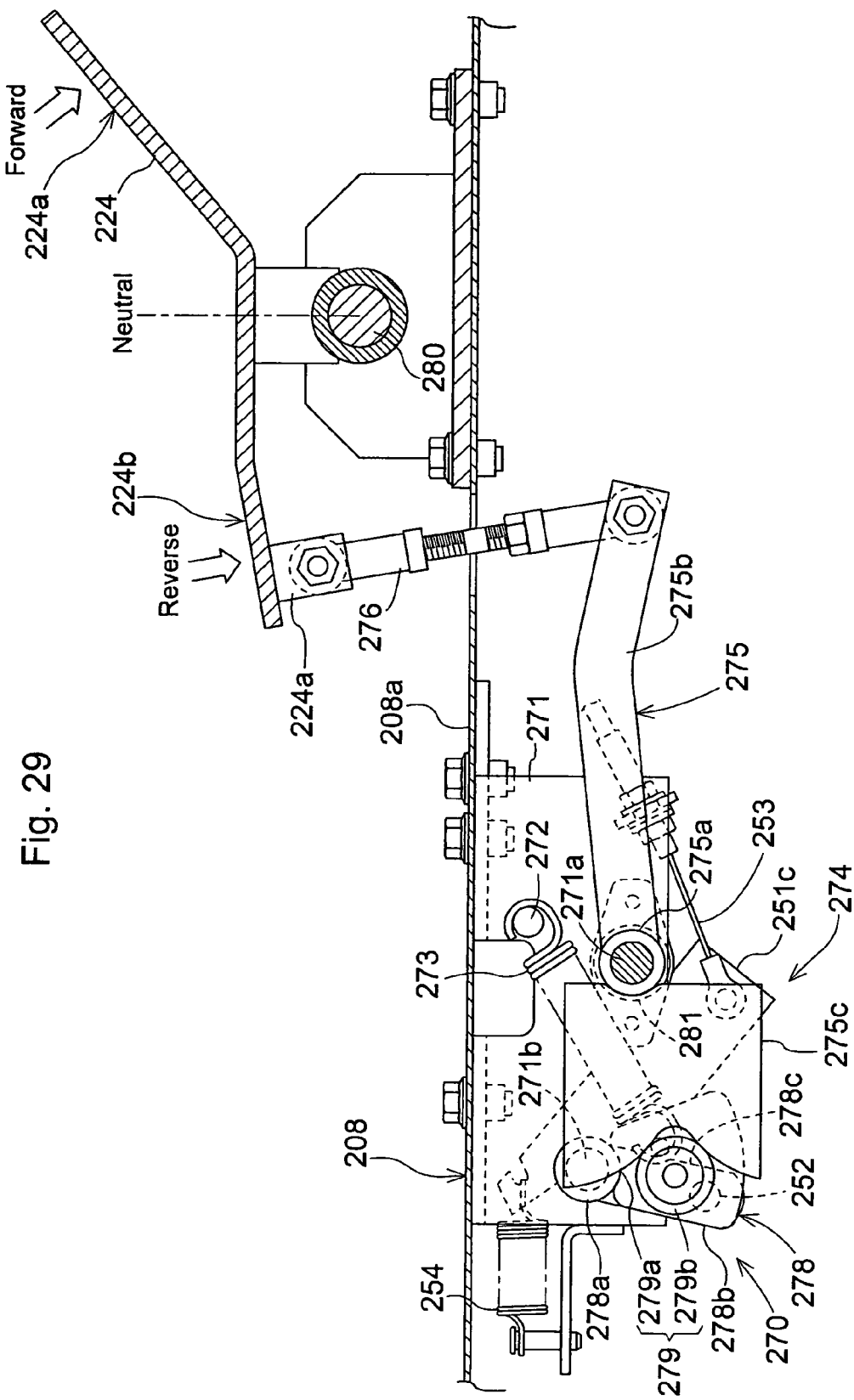
FIG. 29 is a side view of positioning mechanism with a different mechanism.

FIG. 29 is a side view of the positioning mechanism 270 with a different structure. As shown in this drawing, this positioning mechanism 270 has the structure for the rotary damper 281 which is different from the above-mentioned positioning mechanism 270. It has the same structure as the above-mentioned positioning mechanism 270 for parts other than the rotary damper 281.

The structure of the rotary damper 281 is described next.

The body case 281a of the rotary damper 281 is fixed to the damper bracket (not shown) of said shaped base 271. The rotor operation body of the rotary damper 281 is connected with said rotation member 275 concentrically with the pivot shaft 271a of said rotation member 275 as a rotating element of the urging mechanism 274. Thereby, a rotary damper 281 provides a pivoting drag to the speed change pedal 224 through the rotation member 275 and the interlocking rod 276.

The object of the present invention can be attained if, instead of the steering cylinder 226 of the above-mentioned embodiment, the continuously variable speed change device 210 is operated by a mechanism having a motor and a threaded shaft.

Therefore, these steering cylinder 226 and a steering drive mechanism are generally called the speed change actuator 226.

OTHER EMBODIMENTS

[1] The work vehicle may be a riding type rice planting machine, a riding type mowing machine, or a wheel loader.

[2] The continuously variable speed change device 10 may be a belt type etc.

[3] Correlation data may make have a plurality of correlating equations which corresponded to various conditions and/or may have multipliers corresponding to various conditions.

[4] Planetary gear transmission may be used instead of the stepwise change speed device 11.

[5] An electric cylinder, an electric motor or a hydraulic motor, etc. may be used as a control means 55.

[6] The speed change control 24 may be a speed change lever etc.

What is claimed is:

1. A load control structure for a work vehicle comprising:
means for detecting operating position of a manually operated speed change operating element;
engine load detection means for detecting load on an engine of the work vehicle;
swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position; and
control means for controlling the operations of the pump operating means and the motor operating means;
wherein the control means has:
automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and
motor swash plate control means for controlling the motor operating means so as to change the position of the swash plate of the variable displacement motor between the at least two speed change positions, and
wherein the control means further has automatic motor swash plate control means for controlling the motor operating means such that the swash plate of the variable displacement motor is moved from the higher speed position to the lower speed position when the engine load rises beyond a first predetermined value and such that the swash plate of the variable displacement motor is moved from the lower speed position to the higher speed position when the engine load decreases below a second predetermined value.

2. A load control structure according to claim 1, wherein the control means further has mode change-over means for commanding a change in a control mode and wherein.
the control means, based on a command from the mode change-over means, changes among a manual control mode wherein neither the automatic pump swash plate control means nor the automatic motor swash plate control means is operational, a semi-automatic control mode wherein the automatic pump swash plate control means is operational, and an automatic control mode wherein the automatic pump swash plate control means and the automatic motor swash plate control means are operational.

3. A load control structure according to claim 2, wherein control sensitivity of the automatic pump swash plate control means is set to be less sensitive to the engine load in the automatic control mode compared with the sensitivity in the semi-automatic mode.

4. A load control structure according to claim 2, wherein the control means changes the control mode from the automatic mode to the semi-automatic mode if the swash plate of the variable displacement motor is moved from the higher speed position to the lower speed position by the motor swash plate control means during the automatic mode.

5. A load control structure for a work vehicle comprising:
means for detecting operating position of a manually operated speed change operating element;
engine load detection means for detecting load on an engine of the work swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position; and
control means for controlling the operations of the pump operating means and the motor operating means;
wherein the control means has;
automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and
motor swash plate control means for controlling the motor operating means so as to change the position of the swash plate of the variable displacement motor between the at least two speed change positions, and
wherein the control means controls the operation of the pump operating means and the motor operating means such that when the swash plate of the variable displacement motor is moved from the higher speed position to the lower speed position, the swash plate of the variable displacement pump is moved to a lower speed side before the swash plate of the variable displacement motor is moved, and thereafter, the swash plate of the variable displacement pump is moved to a higher speed side substantially simultaneously with the switching movement of the swash plate of the variable displacement motor.

6. A load control structure for a work vehicle comprising:
means for detecting operating position of a manually operated speed change operating element;
engine load detection means for detecting load on an engine of the work vehicle;
swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position; and
control means for controlling the operations of the pump operating means and the motor operating means;
wherein the control means has; automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and
motor swash plate control means for controlling the motor operating means so as to change the position of the swash plate of the variable displacement motor between the at least two speed change positions, and
wherein the control means controls the operation of the pump operating means and the motor operating means such that when the swash plate of the variable displacement motor is moved from the lower speed position to the higher speed position, the swash plate of the variable displacement pump is moved to a lower speed side substantially simultaneously with the switching operation of the swash plate of the variable displacement motor, and thereafter, after the swash plate of the variable displacement motor is moved, the swash plate of the variable displacement pump is moved to a speed position the pump swash plate was at before the motor swash plate was moved.

7. A load control structure for a work vehicle comprising:
means for detecting operating position of a manually operated speed change operating element;
engine load detection means for detecting load on an engine of the work vehicle;
swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position;
control means for controlling the operations of the pump operating means and the motor operating means;
an interlocking mechanism for operatively connecting the speed change operating element with an accelerator mechanism; and set engine rotational speed sensor for detecting a set engine rotational speed set by the accelerator mechanism, and an actual engine rotational speed sensor for detecting an actual engine rotational speed, wherein the control means has;

automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and motor swash plate control means for controlling the motor operating means so as to change the position of the swash plate of the variable displacement motor between the at least two speed change positions, and wherein the control means determines if there is a deviation between the set engine rotational speed detected by the set engine rotational speed sensor and the actual engine rotational speed detected by the actual engine rotational speed sensor, and controls the continuously variable speed change device based on a result of the determination and an operation position detected by the operation position detecting means.

8. A load contiol structure according to claim 7, wherein if the control means determines that there is substantially no deviation between the set engine rotational speed and the actual engine rotational speed, the control means sets a normal control target speed based on detected information from the operation position detecting means and controls the continuously variable speed change device such that the continuously variable speed change device shifts to the operation position corresponding to the normal control target speed, and wherein if the control means determines that there is a deviation between the set engine rotational speed and the actual engine rotational speed, the control means sets a compensating control target speed, which is lower than the normal control target speed, based on detected information from the operation position detecting means, and controls the continuously variable speed change device such that the continuously variable speed change device shifts to the operation position corresponding to the compensating control target speed.

9. A load control structure for a work vehicle comprising:

means for detecting operating position of a manually operated speed change operating element:

engine load detection means for detecting load on an engine of the work vehicle;

swash plate position detecting means for detecting an operating position of a swash plate of a variable displacement pump of a hydrostatic continuously variable speed change device;

pump operating means for steplessly operating the swash plate of the variable displacement pump;

motor operating means for operating a swash plate of a variable displacement motor of the hydrostatic continuously variable speed change device between at least two speed change positions including a higher speed position and a lower speed position; and control means for controlling the operations of the pump operating means and the motor operating means:

wherein the control means has:

automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and motor swash plate control means for controlling the motor operating means so as to change the position of the swash plate of the variable displacement motor between the at least two speed change positions, and wherein the control means controls the operation of the motor operating means such that if the speed change control element is detected to be moved to a lower speed position based on detected information from the operation position detecting means while the control means detects that the engine load fell to a second predetermined value, the swash plate of the variable displacement motor is not changed from the lower speed position to the higher speed position.

10. A load control structure for a work vehicle comprising:

means for detecting operating position of a manually operated speed change operating element;

engine load detection means for detecting load on an engine of the work vehicle; swash plate position detecting means for detecting an operating position of a swash plate of a variable displacement pump of a hydrostatic continuously variable speed change device;

pump operating means for steplessly operating the swash plate of the variable displacement pump;

motor operating means for operating a swash plate of a variable displacement motor of the hydrostatic continuously variable speed change device between at least two speed change positions including a higher speed position and a lower speed position; and control means for controlling the operations of the pump operating means and the motor operating means;

wherein the control means has;

automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and motor swash plate control means for controlling the motor operating means so as to change the position of the swash plate of the variable displacement motor between the at least two speed change positions, and wherein the control means controls the operation of the pump operating means, based on detected information from the load detection means and detected information from the swash plate position detecting means, such that the greater an engine load is, greater is the extent to which the swash plate of the variable displacement pump is operated to a low speed side and the control means further controls the motor operating means such that the swash plate of the variable displacement motor is moved from the higher speed position to the lower speed position when the engine load rises beyond first predetermined value and such that the swash plate of the variable displacement motor is moved from the lower speed position to the higher speed position when the engine load decreases below second predetermined value.

11. A load control structure according to claim 10, wherein the control means changes a value of the first predetermined value to a predetennined value depending on the operation position of the speed change operating element such that the more the operation position of the speed change operating element is to a lower speed side, the smaller is the load at which the swash plate of the variable displacement motor is moved from the higher position to the lower position.

12. A load control structure for a work vehicle comprising:
means for detecting operating position of a manually operated speed change operating element;
engine load detection means for detecting load on an engine of the work vehicle;
swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position; and
control means for controlling the operations of the pump operating means and the motor operating means;
wherein the control means has;
automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and
motor swash plate control means for controlling the motor operating means so as to change the position of the swash plate of the variable displacement motor between the at least two speed change positions, and
wherein the speed change operating element is a pedal.

13. A load control structure for a work vehicle comprising:
means for detecting operating position of a manually operated speed change operating element;
engine load detection means for detecting load on an engine of the work vehicle;
swash plate position detecting means for detecting an operating position of a swash plate of a variable displacement pump of a hydrostatic continuously variable speed change device;
pump operating means for steplessly operating the swash plate of the variable displacement pump;
motor operating means for operating a swash plate of a variable displacement motor of the hydrostatic continuously variable speed change device between at least two speed change positions including a higher speed position and a lower speed position; and
control means for controlling the operations of the pump operating means and the motor operating means;
wherein the control means has;
automatic pump swash plate control means for controlling the operation of the pump operating means, based on detected information from the load detection means and detected information from the swash plate position detecting means, such that the greater an engine load is, greater is the extent to which the swash plate of the variable displacement pump is operated to a low speed side; and
motor swash plate control means for controlling the motor operating means so as to change the position of the swash plate of the variable displacement motor between the at least two speed change positions, and
wherein the control means has a command means, separate from the speed change operating element, for issuing a command to move the swash plate of the variable displacement motor.

* * * * *

UNITED STATES PATENT AND TRADEMARK OFFICE
CERTIFICATE OF CORRECTION

PATENT NO. : 7,469,534 B2  Page 1 of 1
APPLICATION NO. : 11/520457
DATED : December 30, 2008
INVENTOR(S) : Nishi et al.

It is certified that error appears in the above-identified patent and that said Letters Patent is hereby corrected as shown below:

Delete the ABSTRACT as printed and insert the following ABSTRACT:

-- ABSTRACT
A load control structure for a work vehicle includes a device for detecting operating position of a manually operated speed change operating element; an engine load detection device; a swash plate position detecting device; a pump operating device; a motor operating device for operating a swash plate between at least two speed change positions; and a control device. The control device has a pump swash plate control device for controlling the pump operating device, based on detected information from the load detection and swash plate position detecting devices, such that the greater an engine load is, greater is the extent to which the swash plate of the pump is operated to a low speed side; and a motor swash plate control device for controlling the motor operating device so as to change the position of the swash plate of the motor between the at least two speed change positions. --

Column 34, Line 67, Claim 11, "predetennined value" should read
-- predetermined value --

Signed and Sealed this

Twenty-first Day of April, 2009

JOHN DOLL
*Acting Director of the United States Patent and Trademark Office*